US010773702B2

(12) United States Patent
Ohazulike

(10) Patent No.: US 10,773,702 B2
(45) Date of Patent: Sep. 15, 2020

(54) METHOD AND APPARATUS FOR DETERMINING BRAKE WEAR AT A VEHICLE

(71) Applicant: HITACHI, LTD., Chiyoda-ku, Tokyo (JP)

(72) Inventor: Anthony Ohazulike, Valbonne (FR)

(73) Assignee: HITACHI, LTD., Tokyo (JP)

( * ) Notice: Subject to any disclaimer, the term of this patent is extended or adjusted under 35 U.S.C. 154(b) by 365 days.

(21) Appl. No.: 15/878,862

(22) Filed: Jan. 24, 2018

(65) Prior Publication Data
US 2019/0084548 A1 Mar. 21, 2019

(30) Foreign Application Priority Data

Sep. 19, 2017 (EP) ..................................... 17191823

(51) Int. Cl.
*B60W 10/18* (2012.01)
*B60T 17/22* (2006.01)
(Continued)

(52) U.S. Cl.
CPC .............. *B60T 17/22* (2013.01); *F16D 66/00* (2013.01); *F16D 66/02* (2013.01); *G07C 5/008* (2013.01);
(Continued)

(58) Field of Classification Search
CPC ........ B60T 17/22; B60T 8/1766; F16D 66/00; F16D 66/02; F16D 2066/006;
(Continued)

(56) References Cited

U.S. PATENT DOCUMENTS 4,674,326 A * 6/1987 Reinecke ................ F16D 66/00
73/129
6,385,529 B1 * 5/2002 Minowa ............. B60K 31/0008
701/96
(Continued)

FOREIGN PATENT DOCUMENTS

DE 43 16 993 A1 11/1994
FR 2794825 A1 12/2000
(Continued)

OTHER PUBLICATIONS

Druzhinina et al., Speed Control Experiments for Commercial Heavy Vehicles with Coordinated Friction and Engine Compression Brakes, 2002, IEEE, p. 2546-2551 (Year: 2002).*
(Continued)

*Primary Examiner* — Mcdieunel Marc
(74) *Attorney, Agent, or Firm* — Foley & Lardner LLP

(57) ABSTRACT

A method and an apparatus are provided for determining brake wear of a vehicle. A brake wear estimation includes determining, for each of one or more time periods during which a vehicle brake is actuated, a speed of the vehicle at a start time of the respective time period and a speed change parameter indicative of a change of speed of the vehicle during the respective time period. The estimation additionally includes determining, for each of the one or more time periods, a respective brake wear parameter indicative of brake wear of one or more vehicle brakes during the respective time period based on the speed of the vehicle at the start time of the respective time period, the speed change parameter indicative of the change of speed of the vehicle during the respective time period, and the mass or weight of the vehicle.

11 Claims, 5 Drawing Sheets

(51) Int. Cl.
*F16D 66/02* (2006.01)
*F16D 66/00* (2006.01)
*G07C 5/00* (2006.01)
*G01L 5/28* (2006.01)

(52) U.S. Cl.
CPC ........ *F16D 2066/006* (2013.01); *G01L 5/286* (2013.01)

(58) Field of Classification Search
CPC ...... G07C 5/008; G01L 5/286; B60W 30/045; B60W 30/162; B60W 10/18; B60W 50/14; B60W 28/16; B60W 30/18009; B60K 31/02
See application file for complete search history.

(56) References Cited

U.S. PATENT DOCUMENTS

| | | | | |
|---|---|---|---|---|
| 7,308,350 | B2* | 12/2007 | Brown | B60T 7/22 303/1 |
| 8,204,666 | B2* | 6/2012 | Takeuchi | B60W 30/18009 701/70 |
| 8,788,176 | B1* | 7/2014 | Yopp | B60W 30/162 701/96 |
| 9,423,498 | B1* | 8/2016 | Brown | G01S 17/931 |
| 9,493,160 | B2* | 11/2016 | Kelly | B60K 31/02 |
| 10,049,574 | B2* | 8/2018 | Ohsugi | B60W 10/18 |
| 10,384,673 | B2* | 8/2019 | Yamakado | B60T 7/12 |
| 2002/0046909 | A1 | 4/2002 | Sokoll et al. | |
| 2006/0131950 | A1 | 6/2006 | Larson | |
| 2008/0236269 | A1 | 10/2008 | Howell et al. | |
| 2015/0240895 | A1 | 8/2015 | Shin | |
| 2015/0348058 | A1 | 12/2015 | Liu et al. | |

FOREIGN PATENT DOCUMENTS

| | | |
|---|---|---|
| JP | S61-198739 U | 12/1986 |
| JP | 2012-032002 A | 2/2012 |
| JP | 2014-234113 A | 12/2014 |
| WO | WO-2005/090821 A1 | 9/2005 |

OTHER PUBLICATIONS

Lu et al., Multiple-vehicle longitudinal collision avoidance and impact mitigation by active brake control, 2012, IEEE, p. 680-685 (Year: 2012).*

Paredes et al. Combined regenerative and mechanical braking in electric vehicle, 2014, IEEE, p. 935-941 (Year: 2014).*

Marting et al., Regenerative-friction braking distribution. Tool for the comparison of strategies and vehicles configurations, 2013, IEEE, p. 1-6 (Year: 2013).*

Office Action issued in corresponding Japanese Application No. 2018-013088, dated Mar. 19, 2019 with the English tranlation thereof.

Extended European Search Report issued in corresponding application No. 17 19 1823.8 dated Mar. 22, 2018.

* cited by examiner

METHOD AND APPARATUS FOR DETERMINING BRAKE WEAR AT A VEHICLE

The present disclosure relates to a method for determining brake wear at a vehicle, and the present disclosure furthermore relates to an apparatus for determining brake wear at a vehicle, and further to a computer program product for executing a method for determining brake wear at a vehicle, e.g. on a computer, an on-board controller of a vehicle and/or on a mobile computing device.

BACKGROUND

Currently, automakers typically install sensors (or a clip type pin) to detect when a brake pad of a brake of a vehicle needs replacement due to accumulated brake wear. Such sensors do not give any indication or information about how brake pads wear (e.g. over time), nor do they allow to shed light on how driving behaviour degrades brake pads or influences brake pad wear.

Also, automakers may specify a number of travelled kilometres required before a brake needs replacement. However, also such approach does not give any indication or information about how brake pads wear (e.g. over time), nor does it allow to shed light on how driving behaviour degrades brake pads or influences brake pad wear.

Further, in the prior art, there is no brake wear estimation approach which may check if brake pad degradation is caused by the driver's behaviour or by a faulty brake system.

US 2015/0240895 A1 relates to a method for abrasion warning of a brake friction pad of a vehicle. The system may include a friction pad abrasion sensing system (ESC) including a pressure sensor. The ESC system may recognize a speed change in association with a wheel speed sensor of the vehicle, measure a braking pressure using the pressure sensor included in the ESC system when the vehicle is decelerated, calculate and accumulate an abrasion index proportional to the measured braking pressure, and generate and output a notification message when the accumulated abrasion index is more than a predetermined reference value. However, it was recognized by the inventors that a brake pad wear degradation computation can be improved, since the document was recognized to fails considering two factors for brake pad degradation, namely vehicle loading and road slope contributions, e.g. on a downward slope. Further, the document does not show or suggest that the pressure sensor data may be due to a faulty brake system. Also, the document would need additional sensors to be installed and/or access or installation of some kind of electronic control unit.

US 2006/0131950 A1 relates to a brake lining and wear estimation system operating using extant vehicle sensors such as those used to implement height and stability control systems or anti-lock brake systems. Compressed air systems used on heavy duty vehicles to support the operation of various systems, including air brakes, provide pressure monitoring features in various pneumatic circuits, which can be monitored to estimate brake lining application pressure or vehicle loading. Vehicle speed and brake actuation periods are derived from other commonly employed sensors. Data collected from the sensors is supplied to a central, programmable computer over a data bus to generate the heat and wear estimates. However, the document also to fails considering two factors for brake pad degradation, namely vehicle loading and road slope contributions, e.g. on a downward slope, and it cannot show aspects of influence of the driver's behaviour. Further, the document does not show or suggest that an overall detection of a faulty brake system may be performed, but merely appears to consider whether an actuation valve is faulty, thereby neglecting that the brake system as an entire system may be faulty, in that a working brake actuation valve does not infer a faultless brake system.

WO 2005/090821 A1 relates to a sensing system for a disc brake, having an actuator, a lever, one or more adjusting and thrust devices, one or more back plates, receiving brake pads and one or more brake discs. Sensors are provided sensing the position of an actuating stroke and also sensing further features of the disc brake correlated with the stroke. The sensed actuating stroke is compared to a reference value at said sensed further features of the brake. A warning signal is issued if the value of the actuation stroke deviates more than a predetermined value from the reference value. However, the document does not in any way provide a function of brake pad wear estimation, nor does it describe a way as to how the influence of driver behaviour affects brake wear characteristics.

US 2015/0348058 A1 relates to a vehicle computer system configured to communicate with a mobile device, comprising a wireless transceiver configured to communicate with the mobile device. The vehicle computer system also includes a processor in communication with the wireless transceiver. The processor is configured to receive information from one or more vehicle sensors regarding vehicle usage, send the information to an off-board server via the wireless transceiver, wherein the information is utilized in a damages-model regarding the vehicle, and output the information concerning the damages-model to a user display. The document mentions brake pad degradation analysis, but does not give any details on how to efficiently and accurately estimate brake pad degradation in real-time, e.g. for obtaining information on the driver's behaviour and its influence on brake pad degradation, or brake system anomaly or fault detection.

SUMMARY

An object of the present invention is to avoid the problems of the prior art and to provide an improved brake wear determination method which is less complex, more accurate and involves low computation burden and utilizes easily available sensor data.

According to the present invention, for solving the above object, a method for determining brake wear at a vehicle according to claim 1 is proposed. Furthermore, an apparatus for determining brake wear at a vehicle according to claim 14 and a computer program product according to claim 15 are proposed according to the invention. Dependent claims relate to preferred exemplary embodiments.

According to an aspect, there is proposed a method for determining brake wear at a vehicle, comprising determining, for each of one or more time periods during which a brake of the vehicle is actuated, a speed of the vehicle at a start time of the respective time period and/or a speed change parameter indicative of a change of speed of the vehicle during the respective time period, and/or determining, for each of the one or more time periods, a respective brake wear parameter indicative of brake wear at one or more brakes of the vehicle during the respective time period based on the speed of the vehicle at the start time of the respective time period, the speed change parameter indicative of the change of speed of the vehicle during the respective time period, and/or the mass or weight of the vehicle.

According to preferred aspects, plural respective brake wear parameters are preferably determined for plural time periods, and the method preferably further comprises accumulating the plural respective brake wear parameters to determine an accumulated brake wear parameter being indicative of brake wear at one or more brakes of the vehicle during an accumulation duration spanning the plural time periods.

According to preferred aspects, the method may be further comprising determining a remaining lifetime and/or an expected brake replacement time based on the accumulated brake wear parameter and the length of the accumulation duration.

According to preferred aspects, for each of the one or more time periods, a respective first brake wear contribution parameter indicative of brake wear, without slope considerations, at one or more brakes of the vehicle during the respective time period is preferably determined, in particular preferably based on the speed of the vehicle at the start time of the respective time period, the speed change parameter indicative of the change of speed of the vehicle during the respective time period, and/or the mass or weight of the vehicle.

According to preferred aspects, the respective first brake wear contribution parameter is preferably determined to be zero if the change of speed of the vehicle during the respective time period is substantially zero, in particular smaller than a first threshold.

According to preferred aspects, the method may be further comprising determining, for each of one or more time periods during which a brake of the vehicle is actuated, whether the vehicle is traveling on a slope, and/or determining, if it is determined that the vehicle is traveling on a slope, a slope parameter indicative of a slope inclination angle of the slope on which the vehicle is traveling, wherein, for each of the one or more time periods, the respective brake wear parameter is preferably determined further based on determined slope parameter indicative of the slope inclination angle.

According to preferred aspects, for each of the one or more time periods during which it is determined that the vehicle is traveling on a slope, a respective second brake wear contribution parameter indicative of brake wear at one or more brakes of the vehicle during the respective time period is preferably determined based on the speed of the vehicle at the start time of the respective time period, the mass or weight of the vehicle, and/or the respective determined slope parameter indicative of the slope inclination angle.

According to preferred aspects, the respective second brake wear contribution parameter is preferably determined further based on the time length of the respective time period.

According to preferred aspects, the respective second brake wear contribution parameter is preferably determined to be zero if the slope inclination angle during the respective time period is substantially zero, in particular smaller than a second threshold.

According to preferred aspects, the respective brake wear parameter is preferably determined based on the first and second brake wear contribution parameters, in particular based on a linear combination or sum of the first and second brake wear contribution parameters.

According to preferred aspects, the respective brake wear parameter is preferably determined to be zero for time periods in which the brake of the vehicle is not activated, and/or the respective brake wear parameter is preferably determined to be zero for time periods in which the brake of the vehicle is activated and the vehicle speed is determined to be substantially zero, in particular smaller than a third threshold.

According to preferred aspects, the method may be further comprising obtaining sensor data indicative of brake system characteristics of the vehicle, and/or determining whether the brake system is in a faulty state, in particular preferably based on a brake system anomaly detection being preferably performed on the basis of the obtained sensor data, in particular preferably before determining the respective brake wear parameter based on the sensor data and/or parameters derived from the obtained sensor data.

According to preferred aspects, the brake system anomaly detection is preferably performed by mapping the obtained sensor data to an abstract sensor data vector space and/or comparing the vector space position of the mapped sensor data to one or more cluster regions in the vector space which are preferably associated with normal operation of the brake system, in particular by a machine learning algorithm, preferably including mapping sensor data obtained during normal operation of the brake system to the abstract sensor data vector space.

According to another aspect, there is proposed an apparatus for determining brake wear at a vehicle, the apparatus including a memory and a processor being configured to execute: determining, for each of one or more time periods during which a brake of the vehicle is actuated, a speed of the vehicle at a start time of the respective time period and a speed change parameter indicative of a change of speed of the vehicle during the respective time period, and/or determining, for each of the one or more time periods, a respective brake wear parameter indicative of brake wear at one or more brakes of the vehicle during the respective time period based on the speed of the vehicle at the start time of the respective time period, the speed change parameter Indicative of the change of speed of the vehicle during the respective time period, and the mass or weight of the vehicle. The apparatus may be configured to execute any of the method aspects above or below.

According to another aspect, there is proposed a computer program product including a computer program including computer program instructions adapted to cause a controller, computer, processor and/or mobile computing device to execute the steps of a method of any of the above aspects.

While certain exemplary aspects have been described above, it is to be understood that such aspects are merely illustrative of and are not restrictive on the broad invention, and that the exemplary aspects are not limited to the specific constructions and arrangements shown and described above, since various other changes, combinations, omissions, modifications and substitutions, in addition to those set forth in the above paragraphs, are possible.

Those skilled in the art will appreciate that various adaptations, modifications, and/or combination of the just described aspects can be configured. Therefore, it is to be understood that, further aspects may be practiced other than as specifically described herein. Those skilled in the art will also appreciate, in view of this disclosure, that different aspects described herein may be combined to form other aspects of the present disclosure.

DETAILED DESCRIPTION OF THE DRAWINGS AND OF PREFERRED EXEMPLARY EMBODIMENTS

Figure 1:
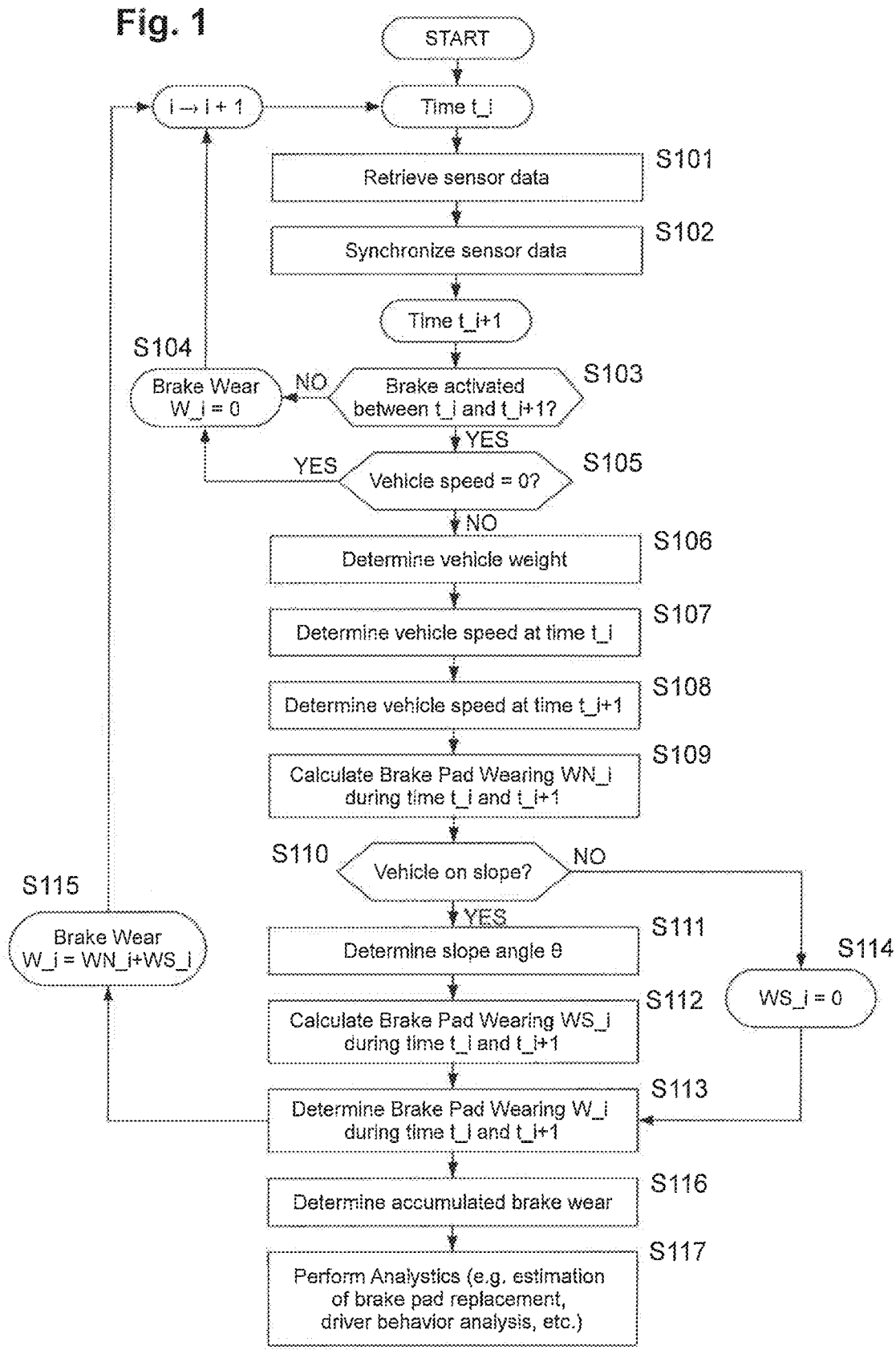
FIG. 1 is an exemplary schematic flow chart illustrating a method of estimating brake wear at a vehicle according to a first exemplary embodiment.

In the following, preferred aspects and embodiments of the present invention will be described in more detail with reference to the accompanying figures. Same or similar features in different drawings and embodiments are referred to by similar reference numerals. It is to be understood that the detailed description below relating to various preferred aspects and preferred exemplary embodiments are not to be meant as limiting the scope of the present invention.

1. Description of Underlying Consideration of Exemplary Embodiments 1.1 Kinetic Energy During Brake Operation In general, during a brake period when a driver of a vehicle actuates the brakes, the initial speed of the vehicle is typically reduced, due to the brake deceleration, to a reduced speed. Such speed decrease reduces the kinetic energy $E_{KIN}$ of the vehicle.

Exemplarily, in the following, it is assumed that an exemplary iterative calculation of brake wear is performed repeatedly between times $t_i$ and $t_{i+1}$ with $t_{i+1} > t_i$ with $i \in \{0, \ldots, n-1\}$ so that $t \in \{t_0, \ldots, t_n\}$. Note that there are n time periods $[t_0, t_1], \ldots [t_{n-1}, t_n]$, but (n+1) different times $t_0, \ldots, t_n$.

While it is exemplarily assumed that there are multiple time periods, with $n > 1$ (e.g. the brake operation is divided into plural time periods), however, a similar calculation may be exemplarily performed in only a single time period (assuming $n=1$).

For a certain time period $[t_i, t_{i+1}]$ of the n time periods, the change $\Delta E_{KIN}$ of the kinetic energy of the vehicle can be derived according to the following equation (1):

$$\Delta E_{KIN}(\{t_i, t_{i+1}\}) = \tfrac{1}{2} \cdot m_{Vehicle} \cdot (v(t_i)^2 - v(t_{i+1})^2), \quad (1)$$

wherein $m_{vehicle}$ is the mass of the vehicle and $v(t_i)$ is the longitudinal speed of the vehicle at the time $t_i$, and specifically $v(t_i)$, may be the speed of the vehicle resolved along the longitudinal axis at the time $t_i$ Since this time period $[t_i, t_{i+1}]$ is a time period of a braking operation (i.e. with activated brake), generally $v(t_{i+1}) < v(t_i)$ remains typically true, so that the above change $\Delta E_{KIN}$ of the kinetic energy of the vehicle is exemplarily calculated as a positive value as an indication of the reduction of the kinetic energy, it is to be noted that the condition $v(t_{i+1}) < v(t_i)$ with activated brake remains typically true on substantially horizontal roads. There may an exception when the vehicle is descending down a slope (i.e. when the vehicle may be travelling on a downwards slope), and in this case it may occur that the condition $v(t_{i+1}) \geq v(t_i)$ even with activated brake (during brake activation). However, in exemplary embodiments, even a situation when the condition $v(t_{i+1}) \geq v(t_i)$ is true even with activated brake (during brake activation) on a downwards slope, a slope contribution can be calculated as discussed further below, so that in exemplary embodiments the brake wear can be conveniently estimated even for time periods when the condition $v(t_{i+1}) \geq v(t_i)$ is true during brake activation.

At the same time, when considering equation (1) and assuming the "normal case" with $v(t_{i+1}) < v(t_i)$ above, the braking force (deceleration force) $F_{Brake}(\{t_i, t_{i+1}\})$ is acting on the vehicle during this time period $[t_i, t_{i+1}]$ and the vehicle travels the distance $\Delta x(\{t_i, t_{i+1}\})$ during the time period $[t_i, t_{i+1}]$, and the physical work that is performed (given by the product of the force and the distance) is equal to the change $\Delta E_{KIN}$ of the kinetic energy of the vehicle, according to the following equation (2):

$$\Delta E_{KIN}(\{t_i, t_{i+1}\}) = F_{Brake}(\{t_i, t_{i+1}\}) \cdot \Delta x(\{t_i, t_{i+1}\}). \quad (2)$$

Based on the above equations (1) and (2), the braking force $F_{Brake}(\{t_i, t_{i+1}\})$ can be derived according to the following equation (3):

$$F_{Brake}(\{t_i, t_{i+1}\}) = \frac{m_{Vehicle} \cdot (v(t_i)^2 - v(t_{i+1})^2)}{2 \cdot \Delta x(\{t_i, t_{i+1}\})} \quad (3)$$

1.2 Brake Friction Forces During Braking

At the same time, the braking force $F_{Brake}(\{t_i, t_{i+1}\})$ can be achieved by a friction force $F_{Friction}(\{t_i, t_{i+1}\})$ per brake of the vehicle times the number of brakes $n_{Brakes}$ of the vehicle. Accordingly, the friction force $F_{Friction}(\{t_i, t_{i+1}\})$ can be derived according to the following equation (4):

$$F_{Friction}(\{t_i, t_{i+1}\}) = \frac{F_{Brake}(\{t_i, t_{i+1}\})}{n_{Brakes}} \quad (4)$$

If it is assumed that the friction force acts basically through the center of a brake pad of a respective brake of the vehicle, then the braking torque $T_{Brake}(\{t_i, t_{i+1}\})$ is basically given by the product of the friction force $F_{Friction}(\{t_i, t_{i+1}\})$ and the mean distance from the center of the circular brake pad to the inner radius $R_1$ and outer radius $R_2$ of the brake pad.

However, nowadays, brakes may have multiple brake pads per brake, so that the number $n_{Pads}$ of brake pads per brake may be considered, according to the following equation (5):

$$T_{Brake}(\{t_i, t_{i+1}\}) = n_{pads} \cdot F_{Friction}(\{t_i, t_{i+1}\}) \cdot \frac{(R_2 - R_1)}{2} \quad (5)$$

For example, for typical brakes, discs and brake pads, a shoe factor of 1.2 and an average friction coefficient $\mu = 0.4$ may be assumed. Of course, for each vehicle and/or brake system, typical values can be derived by experiments.

In order to achieve the above-described brake torque, typically in a hydraulic brake system, a corresponding hydraulic pressure $p(\{t_i, t_{i+1}\})$ needs to be applied over the pad area $A_{Pad}$ (i.e. the area of a corresponding brake pad).

The following equation (6) can be used to calculate the hydraulic pressure required to generate the appropriate braking torque:

$$P(\{t_i, t_{i+1}\}) = \frac{F_{Brake}(\{t_i, t_{i+1}\})}{n_{Pads} \cdot A_{Pad} \cdot \mu} \quad (6)$$

For example, brake discs can be made, for example, of grey cast iron because of the strength and durability thereof, as well as e.g. stable mechanical and frictional properties, wear resistance, heat absorption, thermal conductivity, vibration damping capacity, low cost, etc.

1.3 Brake Wear Analysis Considerations

According to the known analysis methods and their results as derived by Rhee, the Rhee equation, see below equation (7) is known.

Specifically, Rhee developed an empirical wear equation at fixed temperatures (or substantially fixed temperatures), wherein Rhee expressed the mass low of a polymer friction material (such as the material of brake pads) in terms of the contact pressure P, the speed v and the sliding time t, according to the following equation (7):

$$\Delta W = k \cdot P^a \cdot v^b \cdot t^c \quad (7)$$

Herein, $\Delta W$ is a parameter indicative of the mass loss (brake wear) of the polymer friction material of the brake pad(s) based on the contact pressure P, the speed v and the sliding time t. The brake wear parameter $\Delta W$ is indicative of the wear of the brake pad(s).

Based on the units of the proportionality factor k (sometimes referred to as "wear rate coefficient"), the brake wear parameter $\Delta W$ can be given in units of mass (e.g. kg) indicative of a mass loss of the brake pad(s), in units of weight (e.g. N) indicative of a weight loss of the brake pad(s), in units of volume (e.g. m³) indicative of a volume loss of the brake pad(s), or in units of length (e.g. m, cm or μm) indicative of a thickness loss (width loss) of the brake pad(s).

It is to be noted that the numerical parameters a, b, and c in the above Rhee equation (7) are typically dependent on the friction material, e.g. of the brake pad material, and the environmental conditions. However, it was shown by Rhee and further teachings and articles, that the numerical parameters a, b, and c can typically be close to the situation a≈b≈c≈1. In the following it is therefore exemplarily assumed that a=b=c=1, but the following may be easily adapted for other values of a, b, and c. Still, based on the assumption that a=b=c=1, the Rhee equation is exemplarily simplified to the following equation (8):

$$\Delta W = k \cdot P \cdot v \cdot t \quad (8)$$

1.4 Brake Wear Estimation Based on Vehicle Mass

Based on the above equations (6) and (8), for a certain time period $[t_i, t_{i+1}]$ of a certain brake operation, the brake wear parameter $\Delta W(\{t_i, t_{i+1}\})$ being indicative of the brake wear during the certain time period $[t_i, t_{i-1}]$ can be derived according to the following equation (9):

$$\Delta W(\{t_i, t_{i+1}\}) = k \cdot \frac{F_{Brake}(\{t_i, t_{i+1}\})}{n_{Pads} \cdot A_{Pad} \cdot \mu} \cdot v(t_i) \cdot \Delta t(\{t_i, t_{i+1}\}) \quad (9)$$

Herein, it is to be noted that the given speed v in the Rhee equation (7) may be described sometimes as the revolving speed of the brake disc(s), but since the brake disc revolving speed is directly proportional to the overall vehicle speed $v(t_i)$, the below discussions will only refer to the vehicle speed $v(t_i)$, and the proportionality factor between brake disc revolving speed and the vehicle speed $v(t_i)$ may be hidden (absorbed) into the overall proportionality factor k (sometimes referred to as "wear rate coefficient").

Using the above expression for the braking force $F_{Brake}(\{t_i, t_{i+1}\})$ as derived in equation (3), and inserting the same into the above equation (9), the following equation (10) may be used as an expression relating the vehicle mass $m_{Vehicle}$ with the brake wear parameter $\Delta W(\{t_i, t_{i+1}\})$:

$$\Delta W(\{t_i, t_{i+1}\}) = \frac{k \cdot m_{Vehicle} \cdot (v(t_i)^2 - v(t_{i+1})^2) \cdot v(t_i) \cdot \Delta t(\{t_i, t_{i+1}\})}{2 \cdot \Delta x(\{t_i, t_{i+1}\}) \cdot n_{pads} \cdot A_{pad} \cdot \mu} \quad (10)$$

On the other hand, based on an average acceleration $a(\{t_i, t_{i+1}\})$ during the time period $[t_i, t_{i+1}]$, it ca be estimated that:

$$\Delta x(\{t_i, t_{i+1}\}) = v(t_i) \cdot \Delta t(\{t_i, t_{i+1}\}) + \tfrac{1}{2} \cdot a(\{t_i, t_{i+1}\}) \cdot (\Delta t(\{t_i, t_{i+1}\}))^2 \quad (11)$$

With the following defining expression:

$$\Delta v(\{t_i, t_{i+1}\}) = v(t_i) - v(t_{i+1}); \quad (12)$$

and the following equation for the average acceleration $a(\{t_i, t_{i+1}\})$ during the time period $[t_i, t_{i-1}]$:

$$a(\{t_i, t_{i+1}\}) = \frac{v(t_{i+1}) - v(t_i)}{\Delta t(\{t_i, t_{i+1}\})} = \frac{-\Delta v(\{t_i, t_{i+1}\})}{\Delta t(\{t_i, t_{i+1}\})}; \quad (13)$$

the equation (11) may be transformed into the following expression (14):

$$\Delta x(\{t_i, t_{i+1}\}) = \left(v(t_i) - \frac{\Delta v(\{t_i, t_{i+1}\})}{2}\right) \cdot \Delta t(\{t_i, t_{i+1}\}) \quad (14)$$

Furthermore, using equation (12), it can be derived that:

$$v(t_i)^2 - v(t_{i+1})^2 = (v(t_i) + v(t_{i+1})) \cdot (v(t_i) - v(t_{i+1})) = (v(t_i) + v(t_{i+1})) \cdot \Delta v(\{t_i, t_{i+1}\}) \quad (15)$$

and that:

$$v(t_i) + v(t_{i+1}) = 2 \cdot v(t_i) - v(t_i) + v(t_{i+1}) = 2 \cdot v(t_i) - \Delta v(\{t_i, t_{i+1}\}) \quad (16)$$

Furthermore, using equation (16) above, the equation (15) can be transformed as:

$$v(t_i)^2 - v(t_{i+1})^2 = 2 \cdot \left(v(t_i) - \frac{\Delta v(\{t_i, t_{i+1}\})}{2}\right) \cdot \Delta v(\{t_i, t_{i+1}\}) \quad (17)$$

Then, when inserting the expression from equation (17) into the expression of equation (10) above, the following equation (18) may be derived as another expression relating the vehicle mass $m_{Vehicle}$ with the brake wear parameter $\Delta W(\{t_i, t_{i+1}\})$:

$$\Delta W(\{t_i, t_{i+1}\}) = \frac{k \cdot m_{Vehicle} \cdot 2 \cdot \left(v(t_i) - \frac{\Delta v(\{t_i, t_{i+1}\})}{2}\right) \cdot \Delta v(\{t_i, t_{i+1}\}) \cdot v(t_i) \cdot \Delta v(\{t_i, t_{i+1}\})}{2 \cdot \left(v(t_i) - \frac{\Delta v(\{t_i, t_{i+1}\})}{2}\right) \cdot \Delta t(\{t_i, t_{i+1}\}) \cdot n_{Pads} \cdot A_{Pad} \cdot \mu} \quad (18)$$

Upon simplification of the above expression (18), the following equation (19) may be derived as another expression relating the vehicle mass $m_{Vehicle}$ with the brake wear parameter $\Delta W(\{t_i, t_{i+1}\})$:

$$\Delta W(\{t_i, t_{i+1}\}) = \frac{k \cdot m_{Vehicle} \cdot \Delta v(\{t_i, t_{i+1}\}) \cdot v(t_i)}{n_{Pads} \cdot A_{Pad} \cdot \mu} \qquad (19)$$

Specifically, by using the definition $$C_1 = \frac{k}{n_{Pads} \cdot A_{Pad} \cdot \mu} \qquad (20)$$

the brake wear parameter $\Delta W(\{t_i, t_{i+1}\})$ during the time period $[t_i, t_{i+i}]$ of a certain brake operation can be expressed as a function of the vehicle mass $m_{Vehicle}$, the vehicle speed $v(t_i)$ at the beginning of the time period $[t_i, t_{i+1}]$, and the achieved speed difference $\Delta v(\{t_i, t_{i+1}\})$ (speed reduction) during that time period $[t_i, t_{i+1}]$:

$$\Delta W(\{t_i, t_{i+1}\}) = C_1 \cdot m_{Vehicle} \cdot \Delta v(\{t_i, t_{i+1}\}) \cdot v(t_i) \qquad (21)$$

If the brake wear rate (per unit time) may be desired to be determined, the brake wear rate (per unit time) can be obtained as:

$$\frac{W(\{t_i, t_{i+1}\})}{\Delta t(\{t_i, t_{i+1}\})} = C_1 \cdot m_{Vehicle} \cdot |a(\{t_i, t_{i+1}\})| \cdot v(t_i) \qquad (21A)$$

Furthermore, in order to improve the accuracy of the determined/estimated brake wear and/or to accumulate brake wear parameters of a longer brake operation of subsequent n time periods relating to times $t_0, \ldots, t_n$, with $i \in \{0, \ldots, n-1\}$ so that $t \in \{t_0, \ldots, t_n\}$ for the corresponding n time periods $[t_0, t_1], \ldots, [t_{n-1}, t_n]$, the individual determined brake wear parameters $\Delta W(\{t_i, t_{i+1}\})$ can be accumulated according to the following expression (22):

$$\Delta W(\{t_0, t_n\}) = \sum_{i=0}^{n-1} \frac{k \cdot m_{Vehicle} \cdot \Delta v(\{t_i, t_{i+1}\}) \cdot v(t_i)}{n_{Pads} \cdot A_{Pad} \cdot \mu} \qquad (22)$$

$$= \frac{k \cdot m_{Vehicle}}{n_{Pads} \cdot A_{Pad} \cdot \mu} \cdot \sum_{i=0}^{n-1} (\Delta v(\{t_i, t_{i+1}\}) \cdot v(t_i))$$

which can, by using the definition of equation (20) above, be simplified to:

$$\Delta W(\{t_0, t_n\}) = C_1 \cdot m_{Vehicle} \cdot \sum_{i=0}^{n-1} (\Delta v(\{t_i, t_{i+1}\}) \cdot v(t_i)) \qquad (23)$$

Accordingly, when the vehicle mass $m_{Vehicle}$ is known (or measured, estimated or detected) and the vehicle speeds $v(t_i)$ are measured, and speed differences $\Delta v(\{t_i, t_{i+1}\})$ are determined, the highly accurate accumulated brake wear parameter $\Delta W(\{t_0, t_n\})$ can be estimated based on the vehicle mass $m_{Vehicle}$, the measured/estimated vehicle speeds $v(t_i)$, and the determined/estimated speed differences $\Delta v(\{t_i, t_{i+1}\})$.

1.5 Vehicle Mass Contribution

It is to be noted that the vehicle mass $m_{Vehicle}$ can be pre-set according a pre-determined mass or an average mass of the vehicle (e.g. based on a mass of the empty vehicle at production time, which may be modified based on additional weight/mass factors, such as an average fuel weight in a fuel tank, an average weight of a driver, etc,).

In order to further increase accuracy of the brake wear estimation based on the vehicle mass $m_{Vehicle}$, the vehicle mass may be $m_{Vehicle}$ estimated on the basis of an estimation:

$$m_{Vehicle} = m_0 + \sum_j m_j \qquad (24)$$

where $m_0$ is the mass of the empty vehicle and $m_j$ are additional mass contributions which may be estimated and/or measured by appropriate information.

For example, the fuel in the fuel tank may be considered as an additional mass contribution:

$$m_f = FR \cdot V_{Tank} \cdot \sigma_{Fuel} \qquad (25)$$

using the fuel filling ratio FR (e.g. as determined by the fuel tank sensor), the fuel tank volume $V_{Tank}$ and the density $\sigma_{Fuel}$ of the fuel.

Furthermore, based on sensors determining the number of passengers (e.g. weight threshold sensors on seats of the vehicle), the additional mass contribution may be calculated as:

$$m_{Passengers} = n_{Passengers} \cdot m_{Average} \qquad (26)$$

using the estimated number $n_{passengers}$ of passengers and the average mass $m_{Average}$ of a respective average passenger.

For example, one or more weight sensors may be installed in the vehicle, e.g. in the trunk and/or at one or more of the seats of the vehicle, and a detected weight may be used to be added as other mass contributions in equation (25) above.

Also, it is possible to determine additional mass contributions in equation (25) based on sensors of the suspension system, e.g. based on hydraulic pressure of a hydraulic suspension system and/or based on spring displacements of a mechanical suspension system of the vehicle etc.

1.6 Brake Wear Estimation Based on Vehicle Mess and Slope Inclination

In the above, the contribution of the road slope (road inclination) of the road on which the vehicle is traveling has not yet been considered. However, it is proposed that the road slope is additionally considered in order to further improve the accuracy of the brake wear estimation.

Accordingly, during the time period $[t_i, t_{i+1}]$ of a certain brake operation, instead of only considering the braking force $F_{Brake}(\{t_i, t_{i+1}\})$ as above, an additional contribution of the gravitational weight $G_{Vehicle}$ in the longitudinal direction of the vehicle, when the vehicle is traveling on a downward slope with an inclination angle $\theta(\{t_i, t_{i+1}\})$, is additionally considered:

$$F_{Total}(\{t_i, t_{i+1}\}) = F_{Brake}(\{t_i, t_{i+1}\}) - G_{Vehicle} \cdot \sin(\theta(\{t_i, t_{i+1}\})) \qquad (27)$$

with $$F_{Total}(\{t_i, t_{i+1}\}) = \frac{m_{Vehicle} \cdot (v(t_i)^2 - v(t_{i+1})^2)}{2 \cdot \Delta x(\{t_i, t_{i+1}\})} \qquad (28)$$

Herein, in equation (27), using the gravitational acceleration constant g, the relationship between the vehicle mass $m_{Vehicle}$ and the weight $G_{vehicle}$ of the vehicle is given by:

$$G_{Vehicle} = m_{Vehicle} \cdot g \qquad (29)$$

Using again the equation (9) above, and inserting $F_{Brake}(\{t_i, t_{i-1}\})$ as obtained from equation (27) above, the expression for the brake wear parameter $\Delta W(\{t_i, t_{i+1}\})$ can be derived as:

$$\Delta W(\{t_i, t_{i+1}\}) = k \cdot \frac{F_{Total}(\{t_i, t_{i+1}\}) + G_{Vehicle} \cdot \sin(\theta(\{t_i, t_{i+1}\}))}{n_{Pads} \cdot A_{Pad} \cdot \mu} \quad (30)$$

$$v(t_i) \cdot \Delta t(\{t_i, t_{i+1}\}) =$$

$$= k \cdot \frac{\frac{m_{Vehicle} \cdot (v(t_i)^2 - v(t_{i+1})^2)}{2 \cdot \Delta x(\{t_i, t_{i+1}\})} + G_{Vehicle} \cdot \sin(\theta(\{t_i, t_{i+1}\}))}{n_{Pads} \cdot A_{Pad} \cdot \mu} \cdot$$

$$v(t_i) \cdot \Delta t(\{t_i, t_{i+1}\})$$

which can be simplified to:

$$\Delta W(\{t_i, t_{i+1}\}) = \frac{k \cdot m_{Vehicle} \cdot \Delta v(\{t_i, t_{i+1}\}) \cdot v(t_i)}{n_{Pads} \cdot A_{Pad} \cdot \mu} + \frac{k \cdot G_{Vehicle} \cdot \sin(\theta(\{t_i, t_{i+1}\})) \cdot v(t_i) \cdot \Delta t(\{t_i, t_{i+1}\})}{n_{Pads} \cdot A_{Pad} \cdot \mu} \quad (31)$$

Accordingly, based on the equation (31) above, it can be derived that the brake wear $\Delta W(\{t_i,t_{i+1}\})$ can be determined to be based on two contributions, namely a normal brake force wear contribution factor $\Delta W_{Normal}(\{t_i,t_{i+1}\})$ and a slope wear contribution factor $\Delta W_{Slope}(\{t_i,t_{i-1}\})$:

$$\Delta W_{Total}(\{t_i, t_{i+1}\}) = \Delta W_{Normal}(\{t_i, t_{i+1}\}) + \Delta W_{Slope}(\{t_i, t_{i+1}\}) \quad (32)$$

$$\Delta W_{Normal}(\{t_i, t_{i+1}\}) = \frac{k \cdot m_{Vehicle} \cdot \Delta v(\{t_i, t_{i+1}\}) \cdot v(t_i)}{n_{Pads} \cdot A_{Pad} \cdot \mu} \quad (33)$$

$$= C_1 \cdot m_{Vehicle} \cdot \Delta v(\{t_i, t_{i+1}\}) \cdot v(t_i)$$

$$\Delta W_{Slope}(\{t_i, t_{i+1}\}) = \frac{k \cdot G_{Vehicle} \cdot \sin(\theta(\{t_i, t_{i+1}\})) \cdot v(t_i) \cdot \Delta t(\{t_i, t_{i+1}\})}{n_{Pads} \cdot A_{Pad} \cdot \mu} \quad (34)$$

If the brake wear rate (per unit time) due to the slope contribution may be desired to be deter mined, the brake wear rate (per unit time) due to the slope contribution can be obtained as:

$$\frac{\Delta W_{Slope}(\{t_i, t_{i+1}\})}{\Delta t(\{t_i, t_{i+1}\})} = \frac{k \cdot G_{Vehicle} \cdot \sin(\theta(\{t_i, t_{i+1}\})) \cdot v(t_i)}{n_{Pads} \cdot A_{Pad} \cdot \mu} \quad (34A)$$

In the above expressions, the normal brake force wear contribution factor $\Delta W_{Normal}(\{t_i,t_{i+1}\})$ of expression (33) can be calculated according the same expression as the brake wear parameter as derived in equation (10) above.

However, it is to be noted that the slope contribution of the slope wear contribution factor $\Delta W_{Slope}(\{t_i,t_{i+1}\})$ to the overall the brake wear $\Delta W(\{t_i,t_{i+1}\})$ may be significant, and it may even be the most dominating contribution.

For example, assuming that the vehicle drives down a road with a steep downward slope, and, instead of using motor brake, the driver may actuate the mechanical brake on the steep downward slope to try keeping the speed of the vehicle constant. This will represent a strong wear condition for the mechanical brakes, but due to the constant speed held by the driver by the mechanical brake actuation, the normal brake force wear contribution factor $\Delta W_{Normal}(\{t_i,t_{i+1}\})$ will be approximately zero, i.e. $\Delta W_{Normal}(\{t_i,t_{i+1}\}) \approx 0$, since $\Delta v(\{t_i,t_{i+1}\}) \approx 0$.

On the other hand, by the non-zero slope wear contribution factor $\Delta W_{Slope}(\{t_i,t_{i+1}\})$, the brake wear $\Delta W(\{t_i,t_{i+1}\})$ will be determined to be non-zero.

In the above equation (34), using constant time periods of length ε, i.e. with the constant respective time period length $\Delta t(\{t_i,t_{i+1}\})=\varepsilon=\text{const.}$, that is, with $t_{i+1}=t_i+\varepsilon$, the equation (34) can be rewritten as:

$$\Delta W_{Slope}(\{t_i, t_{i+1}\}) = \frac{k \cdot G_{Vehicle} \cdot \sin(\theta(\{t_i, t_{i+1}\})) \cdot v(t_i) \cdot \varepsilon}{n_{Pads} \cdot A_{Pad} \cdot \mu} \quad (35)$$

which can be rewritten, using equation (29), as:

$$\Delta W_{Slope}(\{t_i, t_{i+1}\}) = \frac{k \cdot m_{Vehicle} \cdot g \cdot \sin(\theta(\{t_i, t_{i+1}\})) \cdot v(t_i) \cdot \varepsilon}{n_{Pads} \cdot A_{Pad} \cdot \mu} \quad (36)$$

The slope wear contribution factor $\Delta W_{Slope}(\{t_i,t_{i+1}\})$ of equation (36) can be approximately expressed as:

$$\Delta W_{Slope}(\{t_i, t_{i+1}\}) \approx \frac{k \cdot m_{Vehicle} \cdot g \cdot 0.017 \cdot \theta(\{t_i, t_{i+1}\})[°] \cdot v(t_i) \cdot \varepsilon}{n_{Pads} \cdot A_{Pad} \cdot \mu} \quad (37)$$

The above approximation is quite accurate and conveniently usable for slope inclination angles between 0° and 25° (even up to 30°), which can be understood by using the small angle approximation $\sin(\theta) \approx \theta[\text{rad}]$ for $\theta \in [0°, 25°]$:

$$\sin(1°) = \sin(2\pi/360[\text{rad}]) \approx 2\pi/360 \approx 0.017 \quad (38A)$$

and further:

$$\sin(\theta(\{t_i,t_{i+1}\})+1°) - \sin(\theta(\{t_i,t_{i+1}\})) \approx \theta(\{t_i,t_{i+1}\}) + 2\pi/360 - \theta(\{t_i,t_{i+1}\}) \approx 0.017 \quad (38B)$$

so that, for slope inclination angles between 0° and 25° (even up to 30°), it can be approximated that:

$$\sin(\theta(\{t_i,t_{i+1}\})) \approx 0.017 \cdot \theta(\{t_i,t_{i+1}\})[°] \quad (38C)$$

Furthermore, using the definition:

$$C_2 = \frac{k \cdot \varepsilon \cdot g \cdot 0.017}{n_{Pads} \cdot A_{Pad} \cdot \mu} = C_1 \cdot \varepsilon \cdot g \cdot 0.017 \quad (39)$$

the slope wear contribution factor $\Delta W_{Slope}(\{t_i,t_{i+1}\})$ of expression (37) can be expressed as:

$$\Delta W_{slope} = \frac{k \cdot m_{Vehicle} \cdot \varepsilon \cdot g \cdot 0.017 \cdot \theta_0[°] \cdot v_0}{n_{Pads} \cdot A_{Pad} \cdot \mu} = C_2 \cdot m_{Vehicle} \cdot \theta_0[°] \cdot v_0 \quad (40)$$

On the other hand, when the brake wear rate (brake wear per unit time) due to the slope contribution may be desired to be determined, the brake wear rate (brake wear per unit time) due to the slope contribution can be obtained by using, instead of the above constant $C_2$, the modified constant $C'_2 = C_2/\varepsilon$:

$$C'_2 = \frac{k \cdot g \cdot 0.017}{n_{Pads} \cdot A_{Pad} \cdot \mu} \quad (39A)$$

Furthermore, based on expressions (32) to (34), in order to improve the accuracy of the determined/estimated brake wear and/or to accumulate brake wear parameters of a longer brake operation of subsequent n time periods relating to times $t_0, \ldots, t_n$, with $i \in \{0, \ldots, n-1\}$ so that $t \in \{t_0, \ldots, t_n\}$ for the corresponding n time periods $[t_0, t_1], \ldots, [t_{n-1}, t_n]$, the individual determined brake wear parameters $\Delta W(\{t_i, t_{i+1}\})$ can be accumulated according to the following expression (41):

$$\Delta W = \sum_{i=0}^{n-1} k \cdot \frac{F_{Total}(\{t_i, t_{i+1}\}) + m_{Vehicle} \cdot g \cdot \sin(\theta(\{t_i, t_{i+1}\}))}{n_{Pads} \cdot A_{Pad} \cdot \mu} \cdot v(t_i) \cdot \varepsilon \quad (41)$$

being further expressed as:

$$\Delta W = \quad (42)$$
$$\frac{k \cdot m_{Vehicle} \cdot \varepsilon}{n_{Pads} \cdot A_{Pad} \cdot \mu} \sum_{i=0}^{n-1} \left( \left( \frac{(v(t_i)^2 - v(t_{i+1})^2)}{2 \cdot \Delta x(\{t_i, t_{i+1}\})} + g \cdot \sin(\theta(\{t_i, t_{i+1}\})) \right) \cdot v(t_i) \right)$$

and being further simplified to:

$$\Delta W = \quad (43)$$
$$\frac{k \cdot m_{Vehicle} \cdot \varepsilon}{n_{Pads} \cdot A_{Pad} \cdot \mu} \sum_{i=0}^{n-1} \left( \left( \frac{(v(t_i)^2 - v(t_{i+1})^2)}{2 \cdot \Delta x(\{t_i, t_{i+1}\})} + g \cdot \sin(\theta(\{t_i, t_{i+1}\})) \right) \cdot v(t_i) \right)$$

and being further simplified to:

$$\Delta W = \frac{k \cdot m_{Vehicle} \cdot \varepsilon}{n_{Pads} \cdot A_{Pad} \cdot \mu} \sum_{i=0}^{n-1} \left( \left( \frac{\Delta v(\{t_i, t_{i+1}\})}{\varepsilon} + g \cdot \sin(\theta(\{t_i, t_{i+1}\})) \right) \cdot v(t_i) \right) \quad (44)$$

Assuming $\Delta v(\{t_i, t_{i+1}\}) \approx d = $ const., which is reasonable for at least small time periods of about 1 second, and $\theta(\{t_i, t_{i+1}\}) \approx \theta_0 = $ const., which is reasonable for at least small time periods of about 1 second, as well as $v(t_0) = v_0$, the expression (44) can be further simplified to:

$$\Delta W = \frac{k \cdot m_{Vehicle} \cdot \varepsilon}{n_{Pads} \cdot A_{Pad} \cdot \mu} \quad (45)$$
$$\sum_{i=0}^{n-1} \left( \left( \frac{d}{\varepsilon} + g \cdot 0{,}017 \cdot \theta(\{t_i, t_{i+1}\})[°] \right) \cdot v(t_i) \right)$$
$$= \left( \frac{k \cdot m_{Vehicle} \cdot d}{n_{Pads} \cdot A_{Pad} \cdot \mu} \cdot \sum_{i=0}^{n-1} v(t_i) \right) +$$
$$\left( \frac{k \cdot m_{Vehicle} \cdot \varepsilon \cdot g \cdot 0{,}017 \cdot \theta_0[°]}{n_{Pads} \cdot A_{Pad} \cdot \mu} \sum_{i=0}^{n-1} v(t_i) \right)$$

The sum of the velocities $v(t_i)$ can be derived, using the famous Gauss' formula for $\sum_{i=1}^{n-1} i$, as:

$$\sum_{i=0}^{n-1} v(t_i) = v_0 + (v_0 - d) + (v_0 - 2 \cdot d) + (v_0 - 3 \cdot d) + \ldots \quad (46)$$
$$= \left( v_0 \cdot \sum_{i=0}^{n-1} 1 \right) - \left( d \cdot \sum_{i=1}^{n-1} i \right)$$

-continued
$$= v_0 \cdot n - d \cdot \frac{n \cdot (n-1)}{2}$$

For only one single time period (i.e. with n=1), with $\sum_{i=0}^{n-1} v(t_i) = v_0$ for the time period between times $t_0$ and $t_n = t_1 = t_0 + \varepsilon$, the expression (45) can be simplified to:

$$\Delta W = \Delta W_{Normal} + \Delta W_{Slope} = \quad (47)$$
$$\left( \frac{k \cdot m_{Vehicle} \cdot d \cdot v_0}{n_{Pads} \cdot A_{Pad} \cdot \mu} \right) + \left( \frac{k \cdot m_{Vehicle} \cdot \varepsilon \cdot g \cdot 0{,}017 \cdot \theta_0[°] \cdot v_0}{n_{Pads} \cdot A_{Pad} \cdot \mu} \right)$$

with the contributions:

$$\Delta W_{Normal} = \frac{k \cdot m_{Vehicle} \cdot d \cdot v_0}{n_{Pads} \cdot A_{Pad} \cdot \mu} = C_1 \cdot m_{Vehicle} \cdot d \cdot v_0 \quad (48)$$

and $$\Delta W_{Slope} = \frac{k \cdot m_{Vehicle} \cdot \varepsilon \cdot g \cdot 0{,}017 \cdot \theta_0[°] \cdot v_0}{n_{Pads} \cdot A_{Pad} \cdot \mu} = C_2 \cdot m_{Vehicle} \cdot \theta_0[°] \cdot v_0 \quad (49)$$

similar to the expressions (21) and (40) above, when assuming $\Delta v(\{t_i, t_{i+1}\}) \approx d = $ const., which is reasonable for at least small time periods of about 1 second, and $\theta(\{t_i, t_{i+1}\}) \approx \theta_0 = $ const., which is reasonable for at least small time periods of about 1 second, as well as $v(t_0) = v_0$.

For two time periods (i.e. with n=2), with $\sum_{i=0}^{n-1} v(t_i) = 2 \cdot v_0 - d$ for the time period between times $t_0$ and $t_n = t_2 = t_0 + 2\varepsilon$, the expression (45) can be simplified to:

$$\Delta W = \Delta W_{Normal} + \Delta W_{Slope} = = \left( \frac{k \cdot m_{Vehicle} \cdot d}{n_{Pads} \cdot A_{Pad} \cdot \mu} \cdot (2 \cdot v_0 - d) \right) + \quad (51)$$
$$\left( \frac{k \cdot m_{Vehicle} \cdot \varepsilon \cdot g \cdot \theta_0}{n_{Pads} \cdot A_{Pad} \cdot \mu} \right) \cdot (2 \cdot v_0 - d)$$

with
$$\Delta W_{Normal} = C_1 \cdot m_{Vehicle} \cdot d \cdot (2 \cdot v_0 - d) \text{ and}$$
$$\Delta W_{Slope} = C_2 \cdot m_{Vehicle} \cdot \theta_0[°] \cdot (2 \cdot v_0 - d) \quad (52)$$

2. Exemplary Embodiments of Brake Wear Estimation Methods

FIG. 1 is an exemplary schematic flow chart illustrating a method of estimating brake wear at a vehicle according to a first exemplary embodiment.

The below exemplary aspects assume that a calculation/estimation of a brake wear of one or more brake pads of brakes of a vehicle is performed for each of one or more time periods $\{t_i, t_{i+1}\}$ with $i=0$ to $i=n-1$ with $n \geq 1$.

For example, the time periods can be of an equal computation time length $\varepsilon$ so that $t_{i+1} = t_i + \varepsilon$ or, in other words, such that $\Delta t(\{t_i, t_{i+1}\}) = \varepsilon$. For example, the computation time duration $\varepsilon$ can be selected as 0.1 s, 0.5 s, 1 s, 2 s, or the like. Preferably, the computation time duration $\varepsilon$ is smaller or equal to an average time duration of a braking operation in which the driver of the vehicle actuates the vehicle brakes.

In order to improve the accuracy of the determined/estimated brake wear and/or to accumulate brake wear parameters of a longer brake operation of subsequent n time periods relating to times $t_0, \ldots t_n$, with $i \in \{0, \ldots, n-1\}$ so that $t \in \{t_0, \ldots, t_n\}$ for the corresponding n time periods $[t_0, t_1], \ldots, [t_{n-1}, t_n]$, the individual determined brake wear parameters can be determined/estimated/calculated for each time period.

The calculation during one or more time periods can be activated upon detecting that the brake is activated for the duration of brake activation, so as to be only performed when the brakes are actually actuated. In other exemplary embodiments, it is possible that the calculation/estimation of brake wear is continuously performed, wherein the brake wear is calculated/determined to be zero for time periods in which the brake is not actuated, as exemplarily assumed in the below-described embodiments.

The brake wear computation exemplarily starts, in FIG. 1, at a time $t_i$ (which may exemplarily be referred to as start time $t_0$. However, since the calculation (brake wear estimation) is exemplarily performed for each time period $\{t_i, t_{i+1}\}$ with i=0 to i=n−1 with n≥1, only one time period $\{t_i, t_{i+1}\}$ is exemplarily described.

In FIG. 1, for the time period $\{t_i, t_{i+1}\}$, step S101 is performed for retrieving sensor data and step S102 is (optionally) performed for synchronizing sensor data as retrieved in step S101.

The sensor data retrieved in step S101 may include sensor data indicative of a vehicle speed. On the other hand, the vehicle speed can also be determined based on plural position measurements of the vehicle position by a position sensor.

Furthermore, the sensor data retrieved in step S101 may include sensor data indicative of a longitudinal acceleration (e.g. a longitudinal g-force sensor. Furthermore, longitudinal acceleration or deceleration or change of vehicle speed may be determined based on the sensor data indicative of a vehicle speed.

Furthermore, for example for determining whether the brake system is actuated by the driver, the sensor data may be indicative of whether the brake system is actuated or not, e.g. based on a brake signal of a brake sensor and/or based on a pressure sensor detecting a pressure of the hydraulic brake system (e.g. brake pressure and/or brake cylinder pressure), or the like.

Furthermore, exemplarily one or more weight sensors may be provided to detect a vehicle weight (e.g. based on one or more sensors detecting a status of the suspension system), or one or more weight sensors detecting a weight contribution on one or more seats of the vehicle, in the trunk of the vehicle, or the like.

Furthermore, if the fuel in the fuel tank is additionally considered as a contribution of the weight or mass of the vehicle, the sensor data may include fuel sensor data indicative of a filling state of fuel in the fuel tank, for estimating the weight contribution of the fuel.

Furthermore, for exemplary embodiments in which brake wear is estimated also considering a slope contribution, the retrieved sensor data may include sensor data indicative of a slope inclination of the vehicle, e.g. based on gyroscope sensor data of a gyroscope sensor, based on altitude measurements, e.g. in which a slope inclination is determined based on a speed of the vehicle and a measured change of altitude. Additionally or alternatively, a slope inclination can be determined based on position data and navigational map data indicative of road slope inclination angles as a function of vehicle position.

Furthermore, since underlying parameters such as the friction coefficients and/or brake wear rate coefficients may be temperature dependent, such parameters may be adjusted based on temperature, and for such exemplary embodiments, the sensor data may additionally include sensor data indicative of a brake temperature of the brake(s) of the vehicle. Also, parameters a, b and c of the Rhee expressions may be adjusted based on temperature-dependent models.

Since some sensor data may be needed to be pulled, or other sensor data may be provided (pushed) repeatedly at sample frequencies that may be smaller or typically larger than the computation frequency (e.g. $1/\varepsilon$) of the brake wear estimation or computation thereof, different sensor data inputs can be synchronized to the computation frequency (e.g. $1/\varepsilon$) of the brake wear estimation or computation thereof in step S102.

When (optionally synchronized) sensor data is available for the time period $\{t_i, t_{i+1}\}$, the method of FIG. 1 exemplary includes the step S103 of checking whether the brake(s) were activated (actuated) during the time period $\{t_i, t_{i+1}\}$. For example, it is determined whether a brake signal was output to the brake system during the time period $\{t_i, t_{i+1}\}$, e.g. based on a driver actuating a brake pedal during the time period $\{t_i, t_{i+1}\}$.

If step S103 returns NO, i.e. the brake(s) were not activated (actuated) during the time period $\{t_i, t_{i+1}\}$, then the brake wear estimation determines in step S104 that a brake wear parameter during the time period $\{t_i, t_{i+1}\}$ was zero, since no brake wear can have occurred during the time period $\{t_i, t_{i+1}\}$ when the brake system was not activated, i.e. it is determined that $\Delta W(\{t_i, t_{i+1}\}) = 0$ for the time period $\{t_i, t_{i+1}\}$. Note that $\Delta W(\{t_i, t_{i+1}\})$ is exemplarily referred to as W_i in the figures.

As previously mentioned, the brake wear parameter $\Delta W(\{t_i, t_{i+1}\})$ is preferably determined such that it is indicative of a brake wear of the brakes) of the vehicle during the time period $\{t_i, t_{i+1}\}$, i.e. by being indicative of a mass or weight loss of one or more brake pads of the brake(s) of the vehicle during the time period $\{t_i, t_{i+1}\}$, a loss of volume of one or more brake pads of the brake(s) of the vehicle during the time period $\{t_i, t_{i+1}\}$, and/or a loss of pad width (pad thickness) of one or more brake pads of the brake(s) of the vehicle during the time period $\{t_i, t_{i+1}\}$, wherein the latter can also be referred to as brake pad wear displacement. Such parameters can be compared against an initial total mass, weight, volume and/or pad width of the one or more brake pads of the brake(s) of the vehicle, e.g. to determine a wear ratio or wear percentage of brake wear occurring during the time period $\{t_i, t_{i+1}\}$.

However, if step S103 returns YES, i.e. the brake(s) were activated (actuated) during the time period $\{t_i, t_{i+1}\}$, then it is optionally further determined/checked in step S105 whether the vehicle speed was determined or detected to be zero during the time period $\{t_i, t_{i+1}\}$, i.e. whether $v(\{t_i, t_{i+1}\}) = 0$ (or whether the vehicle speed was determined or detected to be substantially zero during the time period $\{t_i, t_{i+1}\}$, i.e. whether $v(\{t_i, t_{i+1}\}) < \alpha$, wherein $\alpha$ may be a sensor correction factor as a threshold).

The check of step S105 is exemplarily performed to avoid brake wear estimation when the driver activates the brake when the vehicle is stopped, e.g. when standing at a red traffic light or in traffic jam, since such brake activation does not result in brake wear). However, it is to be noted that the break wear parameters calculated based on expressions given above, the brake wear contributions are typically determined to be proportional to the vehicle speed, so the option exemplary step 3105 has the benefit that a computation is avoided for time periods in which the vehicle speed is zero or at least substantially zero, for reducing the computational burden.

Therefore, exemplarily, if step 3105 returns YES, then the brake wear estimation determines in step S104 that a brake wear parameter during the time period $\{t_i,t_{i+1}\}$ was zero, since no substantial brake wear can have occurred during the time period $\{t_i,t_{i+1}\}$ when the brake system was activated but the vehicle speed was zero or at least substantially zero, i.e. it is determined that $\Delta W(\{t_i,t_{i+1}\})=0$ for the time period $\{t_i,t_{i+1}\}$. Note that $\Delta W(\{t_i,t_{i+1}\})$ is exemplarily referred to as W_i in the figures.

However, if step S105 returns NO, the computational brake wear estimation is performed, e.g. as described below.

Based on sensor data and optionally further based on pre-determined parameters (such as e.g. parameters such as the vehicle mass or weight of the empty vehicle, the correlation factor between brake disc revolving speed and vehicle speed, the number of brakes $n_{Brakes}$, the number of brake pads $n_{Pads}$ per brake, the area $nA_{Pads}$ of brake pads, and or other input parameters such as the friction coefficient $\mu$ and/or the brake wear rate coefficient k, and/or other parameters used in computations, which may be pre-determined and/or pre-stored in a memory), the method performs the brake wear estimation for the time period $\{t_i,t_{i+1}\}$.

Exemplarily, in step S106, the mass or weight of the vehicle is determined, e.g. based on pre-determined data and/or sensor data. Herein, a pre-determined parameter may be used, and/or additional weight contributions may be added or considered, e.g. as described further above, including passage weight, trunk content weight, and/or fuel weight, etc. Also, based on sensors of the suspension system, a total weight of the vehicle may be determined or detected.

Exemplarily, in steps S107 and 3108, the vehicle speeds at times $t_i$ and $t_{i+1}$ are determined, e.g. based on speed sensor data. That is, steps 3107 and S108 determined the respective vehicle speeds $v(t_i)$ and $v(t_{i+1})$, respectively. This may be used to also determine the vehicle speed change $\Delta v(\{t_i,t_{i+1}\})$ during the time period $\{t_i,t_{i+1}\}$ based on the results of steps S107 and S108. Additionally or alternatively, the vehicle speed change $\Delta v(\{t_i,t_{i+1}\})$ during the time period $\{t_i,t_{i+1}\}$ may be detected based on acceleration sensor data, e.g. from a g-force sensor.

Based on the above sensor data and/or determined parameters, the normal brake wear contribution (without considering slope inclination) during the time period $\{t_i,t_{i+i}\}$ can be determined, computed or estimated in step S109, e.g. based on one of the expressions above, e.g. for $\Delta W_{Normal}(\{t_i,t_{i+1}\})$, (exemplarily referred to as WN_i in the figures), for example, as:

$$\Delta W_{Normal}(\{t_i, t_{i+1}\}) = \frac{k \cdot m_{Vehicle} \cdot \Delta v(\{t_i, t_{i+1}\}) \cdot v(t_i)}{n_{Pads} \cdot A_{Pad} \cdot \mu}$$

Accordingly, a brake wear parameter (without slope contribution) can be determined is step S109 based on the vehicle mass (or weight), the vehicle speed at the beginning of the present time period, and the change of the vehicle speed during the present time period.

Further exemplarily, optionally, an additional slope contribution to the estimated brake wear during the present time period $\{t_i,t_{i+1}\}$ can be determined.

If the vehicle is detected to not be located on a slope (step S110 gives NO), the slope contribution $\Delta W_{Slope}(\{t_i,t_{i+1}\})$, (exemplarily referred to as WS_i in the figures), can be determined to be zero, i.e. $\Delta W_{Slope}(\{t_i,t_{i+1}\})=0$ in step S114.

However, if step S110, which determines based on sensor data and/or navigation map data, whether the vehicle is located/traveling on a slope, specifically a downward slope (e.g. based on slope and travel direction or velocity direction), results in YES, the slope brake wear contribution (considering slope inclination) during the time period $\{t_i,t_{i+1}\}$ can be determined, computed or estimated in step S112, based on the above sensor data and/or determined parameters, e.g. based on one of the expressions above, e.g. for $\Delta W_{slope}(\{t_i,t_{i+i}\})$, (exemplarily referred to as WS_i in the figures), for example, as:

$$\Delta W_{Slope}(\{t_i, t_{i+1}\}) = \frac{k \cdot m_{Vehicle} \cdot g \cdot \sin(\theta(\{t_i, t_{i+1}\})) \cdot v(t_i) \cdot \varepsilon}{n_{Pads} \cdot A_{Pad} \cdot \mu}$$

or as $$\Delta W_{Slope}(\{t_i, t_{i+1}\}) \approx \frac{k \cdot m_{Vehicle} \cdot g \cdot 0.017 \cdot \theta(\{t_i, t_{i+1}\})[°] \cdot v(t_i) \cdot \varepsilon}{n_{Pads} \cdot A_{Pad} \cdot \mu}$$

Accordingly, a brake wear parameter (relating to the slope contribution) can be determined is step S112 based on the vehicle mass (or weight), the vehicle speed at the beginning of the present time period, and the slope inclination angle.

Then, in step S113, the individual brake wear contributions are combined for determining an overall brake wear $\Delta W(\{t_i,t_{i+1}\})$ during the time period $\{t_i,t_{i+1}\}$, for example the contributions determined in steps S109 and S114 or S112 may be added (e.g. step S115) or aggregated by an aggregation rule which may take into account weighting factors.

Accordingly, an overall brake wear $\Delta W(\{t_i,t_{i+1}\})$ during the time period $\{t_i,t_{i+1}\}$ can be determined, exemplarily based on the vehicle mass (or weight), the vehicle speed at the beginning of the present time period, the change of the vehicle speed during the present time period, and the slope inclination angle.

Furthermore, optionally in step S116, overall brake wear parameters $\Delta W(\{t_i,t_{i+1}\})$ of multiple time periods can be accumulated, e.g. since a time of last brake pad replacement, so as to estimate a total brake wear of brake pad(s) of the brake(s) of the vehicle.

Accordingly, the accumulated total brake wear of brake pad(s) of the brake(s) of the vehicle can be determined in step S116, and this exemplarily allows to estimate a remaining expected lifetime of the brake packs) of the brake(s) of the vehicle and/or an estimated expected next replacement time, at which the brake pad(s) of the brakes) of the vehicle may be expected to be needed to be replaced. Such estimations can be done in an optional analytics step S117.

Furthermore, such analytics operation in step S117 may analyze driver behavior, such as e.g. average brake wear per traveled distance based on driver behavior, or the like. This may allow that a driver may adjust their driving style based on such information.

Information presented to the driver may include: an accumulated brake wear value, a brake wear value for the last brake operation, an average brake wear value per travel distance and/or per driving time, an expected estimated remaining lifetime of brake pad(s), an expected replacement timing for brake pad replacement, etc.

This has the additional benefit that real-time information about a brake wear behavior, e.g. based on current road conditions, slope conditions, traffic conditions, load conditions of the vehicle (e.g. with multiple passengers and/or a loaded trunk), driver behavior, etc. and predictions on lifetime and expected replacement timing, can be conveniently and accurately provided to the driver, dynamically and/or in real-time, based on low computational burden and limited sensor input, so that no additional brake wear sensors may be needed.

Figure 2:
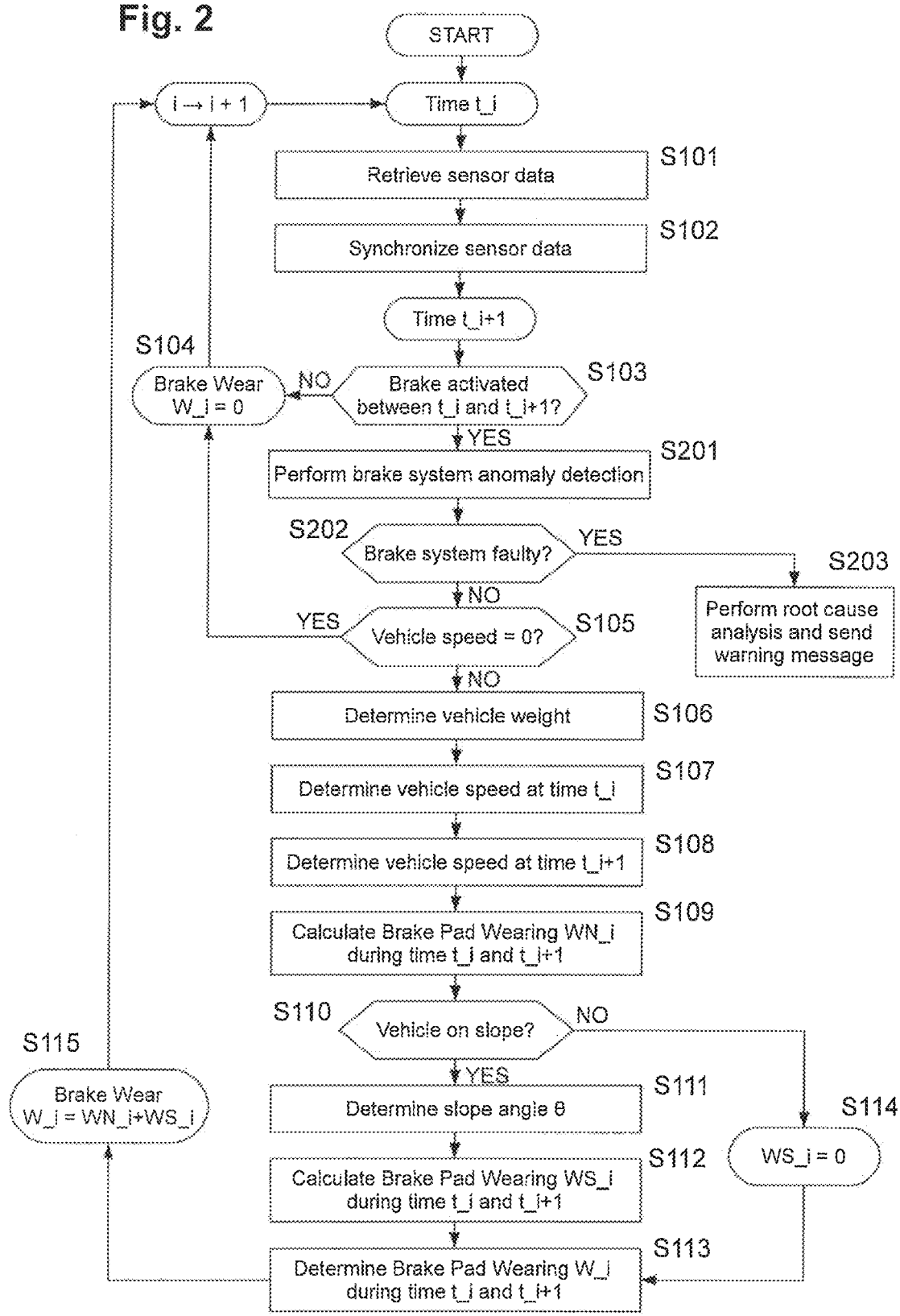
FIG. 2 is an exemplary schematic flow chart illustrating a method of estimating brake wear at a vehicle according to a second exemplary embodiment.

FIG. 2 is an exemplary schematic flow chart illustrating a method of estimating brake wear at a vehicle according to a second exemplary embodiment.

Exemplarily, the method of FIG. 2 is similar to the method of FIG. 1, wherein the additional steps S116 and S117 may also be provided in FIG. 2. The method in FIG. 2 is different from the FIG. 1 by the additional steps S201, S202 and S203.

When it is detected that the brake(s) is/are activated in step S103, the sensor data relating to the brake system are analyzed in step S201 for performing a brake system anomaly detection.

For example, plural sensor values relating to the brake system, e.g. including the one, or more or all of the sensor data obtained in step S101, may be mapped to a sensor signal vector space. Based on normal operation conditions, e.g. based on machine learning algorithms, it may be checked, whether the sensor data (and/or its vector space representation) may indicate a brake system anomaly or brake system failure.

Exemplarily, a machine learning system can be provided according to a model that uses brake-related sensor data form normal operations are collected, and are trained to be recognized as sensor data (or a vector space representation thereof) which is located in a cluster of normal data (e.g. a normal cluster in the sensor data vector space).

Then, step S201 may collect sensor data and may recognize whether the collected sensor data represents sensor data of a normal operation or whether the sensor data may indicate a brake system anomaly or brake system failure. For example, the newly obtained set (e.g. vector) of current sensor data can be checked against clusters in sensor data space relating to normal operation conditions.

For example, according to a machine learning model, sensor data during normal operation may be mapped into an abstract sensor data vector space, and this may determine one or more clusters of regions in the abstract sensor data vector space representing normal brake system operations. On the other hand, if currently obtained sensor data is mapped to a vector space position which is distant from any of the one or more normal operation's cluster regions in the abstract sensor data vector space, then the brake system can be detected to be faulty (e.g. having an anomaly or failure).

Based on the brake system anomaly detection of step S201, it is determined whether the brake system is faulty (e.g. by detecting an anomaly or failure) in step S202, and if step S202 gives YES, a root cause analysis can be exemplarily performed in optional step S203. Alternatively or in addition, a warning message can be output to the driver and/or the vehicle control system.

On the other hand, if step S202 results in NO, the method is performed normally, e.g. in accordance with the method of FIG. 1 above.

3. Exemplary Embodiments of Brake Wear Estimation Apparatus

Figure 3:
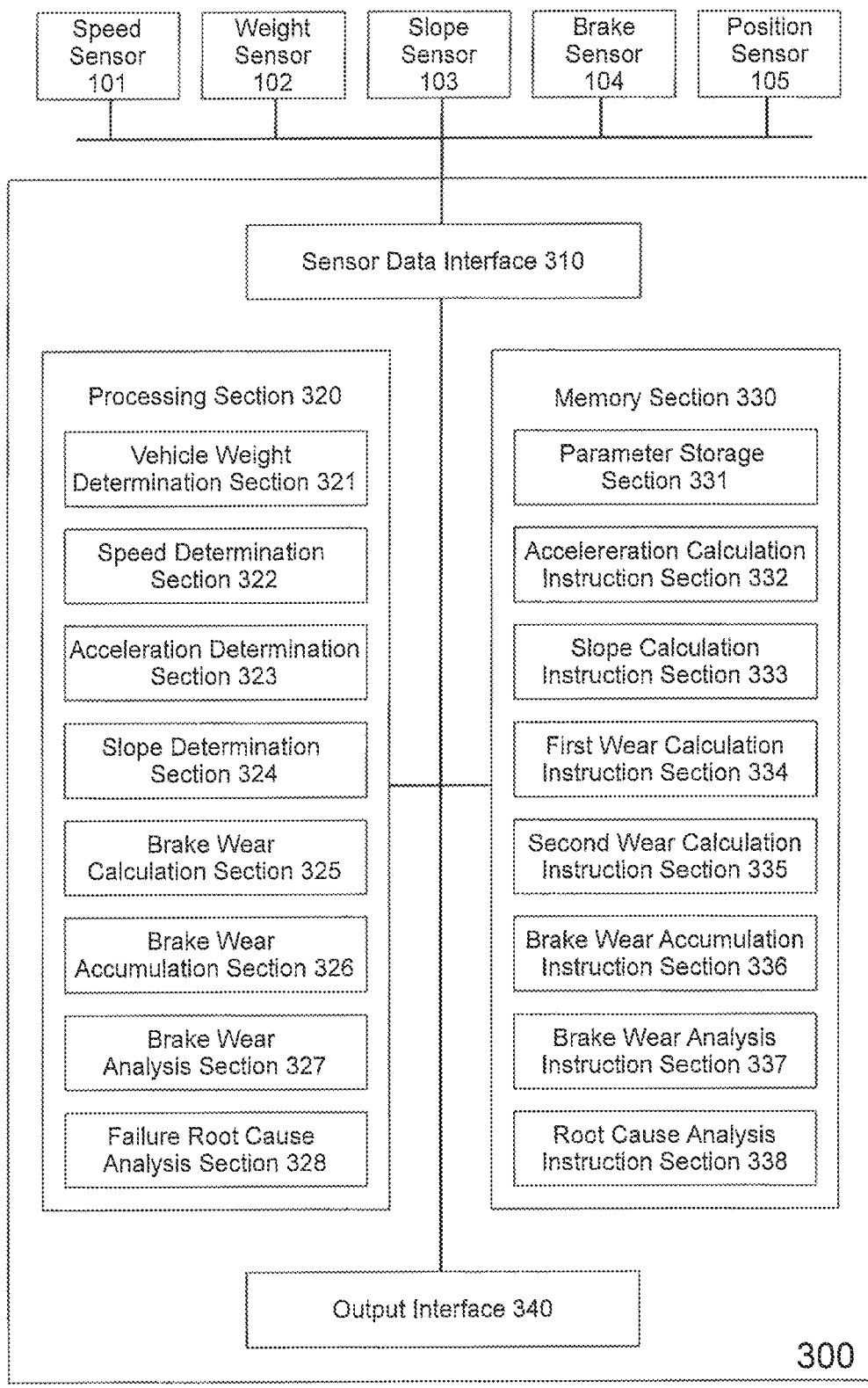
FIG. 3 is an exemplary schematic view illustrating an apparatus configured to execute estimating brake wear at a vehicle according to exemplary embodiments.

FIG. 3 is an exemplary schematic view illustrating an apparatus configured to execute estimating brake wear at a vehicle according to exemplary embodiments.

It is to be noted that the apparatus configuration can be obtained by hardware or software or any combination thereof. Such apparatus configuration may be implemented in a control system of a vehicle, and/or it may be implemented in a computer or computer system. Most conveniently, the apparatus configuration may be implemented in a mobile device, such as e.g. a notebook computer or mobile phone. The latter is conveniently possible, since brake wear estimation according to exemplary embodiments can be achieved based on sensor data which can be obtained by communication with the On-Board Diagnosis system of the vehicle (such as OBD or OBD-2). Therefore, while possible, it is advantageously not necessary that the apparatus is communicably connected or implemented in communication with the Controller Area Network (CAN) of the vehicle, but required sensor data may be obtained more easily, e.g. by communication with the On-Board Diagnosis system of the vehicle (such as OBD or OBD-2).

The exemplary apparatus 300 exemplarily includes a sensor data interface 310 for being communicably connected to sensors, a sensor system or at least a sensor data providing system (such as e.g. an On-Board Diagnosis system of the vehicle, such as OBD or OBD-2).

In FIG. 3, the apparatus 300 is exemplarily configured to retrieve sensor data, via the sensor data interface 310, from a speed sensor 101 providing sensor information on a speed of the vehicle, a weight sensor 102 providing sensor information on a weight of the vehicle and/or weight contributions (e.g. on passenger weight, trunk content weight and/or fuel weight), a slope sensor 103 providing sensor information on a slope inclination angle at the vehicle's position, a brake sensor 104 providing sensor information on whether a brake of the vehicle is activated or not, and a position sensor 105 providing sensor information on a position of the vehicle.

In some exemplary embodiments, other sensors may be additionally provided or one or more of the above sensors may be avoided, e.g. based on sensor data considerations as discussed above in connection with exemplary methods and exemplary brake wear computation expressions.

It is also to be noted that the sensor data interface 310 may be configured to communicate with sensors directly and/or with a vehicle control) system and/or vehicle on-board diagnosis system providing sensor data and/or information determined based on currents sensor data.

Also, the apparatus 300 may include additional sensors, such as position detection sections (e.g. based on satellite navigation systems), altitude sensors, navigation system components, acceleration sensors, special orientation sensors (such as gyroscopes, etc.), etc.

Furthermore, the sensor data interface 310 may be configured to establish wired communication connections, e.g. via Ethernet, USB, etc., or via wireless communication connections, e.g. via WLAN (WiFi), Bluetooth, mobile phone connections (such as 3G, 4G or LTE), or radio communications.

Furthermore, for providing information to a driver of the vehicle (or more generally a user of the apparatus 300), the apparatus 300 exemplarily includes an output interface 340 which can communicably connect, also by wired or wireless communication connection, with a human-machine interface of the vehicle, and/or with other input/output devices for human-machine communications, including but not limited to a display, a touch screen, an audio output, a command line interface, a graphical user interface, a mouse, a keyboard, control buttons, or other known input/output devices.

Furthermore, the apparatus 300 exemplarily includes a processing section 320 (which may include one or more processors) and a memory (and or storage) section 330 (which may include volatile and/or non-volatile memory, RAM, ROM, NVRAM, hard disk storage, USB-storage devices, flash storage, etc.), including operating system and one or more application software sections of instructions causing the processing section 320 to perform computations, calculations and computer-implemented methods based on the instructions.

Exemplarily, the processing section 320 includes a vehicle weight determination section 321 configured to determine a mass and/or weight of the vehicle, e.g. based on sensor data and/or based on data pre-stored in a parameter storage section 331 of the memory section 330.

Further exemplarily, the processing section 320 includes a speed determination section 322 configured to determine a speed of the vehicle, e.g. based on sensor data and/or based on data pre-stored in a parameter storage section 331 of the memory section 330.

Further exemplarily, the processing section 320 includes an acceleration determination section 323 configured to determine an acceleration of the vehicle, e.g. based on sensor data, output from the speed determination section 322, and/or based on data pre-stored in a parameter storage section 331 of the memory section 330, preferably operated on the basis of instructions stored in an acceleration calculation instruction section 332 of the memory section 330.

Further exemplarily, the processing section 320 includes a slope determination section 324 configured to determine/estimate a slope inclination angle at the current location of the vehicle, e.g. based on sensor data, and/or based on data pre-stored in a parameter storage section 331 of the memory section 330, such as e.g. navigational map data, preferably operated on the basis of instructions stored in a slope calculation instruction section 333 of the memory section 330.

Further exemplarily, the processing section 320 includes brake wear calculation section 325 configured to determine/estimate a brake wear parameter (such as the brake wear parameters $W\_i$, $WN\_i$, and/or $WS\_i$ above), e.g. based on sensor data, and/or based on data pre-stored in a parameter storage section 331 of the memory section 330, preferably operated on the basis of instructions stored in the first and second brake wear instruction sections 334 and 335 of the memory section 330, wherein the first brake wear instruction sections 334 may include instructions for normal brake wear computations (e.g. for computing $WN\_i$ above) without slope considerations, and/or the second brake wear instruction section 335 may include instructions for slope considering brake wear computations (e.g. for computing $WS\_i$ above) slope inclination considerations.

Further exemplarily, the processing section 320 includes a brake wear accumulation section 326 configured to accumulate brake wear parameters computed for multiple brake wear estimation time periods (such as for accumulating the brake wear parameters $W\_i$, $WN\_i$, and/or $WS\_i$ above for multiple time periods), preferably operated on the basis of instructions stored in the brake wear accumulation instruction section 336 of the memory section 330.

Further exemplarily, the processing section 320 includes a brake wear analysis section 327 configured to analyze computed and/or accumulated brake wear parameters (such as for brake pad lifetime estimations, replacement time estimation predictions, driver behavior analysis, etc.), preferably operated on the basis of instructions stored in the brake wear analysis instruction section 337 of the memory section 330.

Further exemplarily, the processing section 320 includes a root cause analysis section 328 configured to perform a brake system anomaly detection and/or root cause analysis thereof (e.g. based on a machine learning model as discussed above), preferably operated on the basis of instructions stored in the root cause analysis instruction section 338 of the memory section 330.

4. Exemplary Real-Time Brake Wear Estimation and Accumulated Brake Wear

Figure 4:
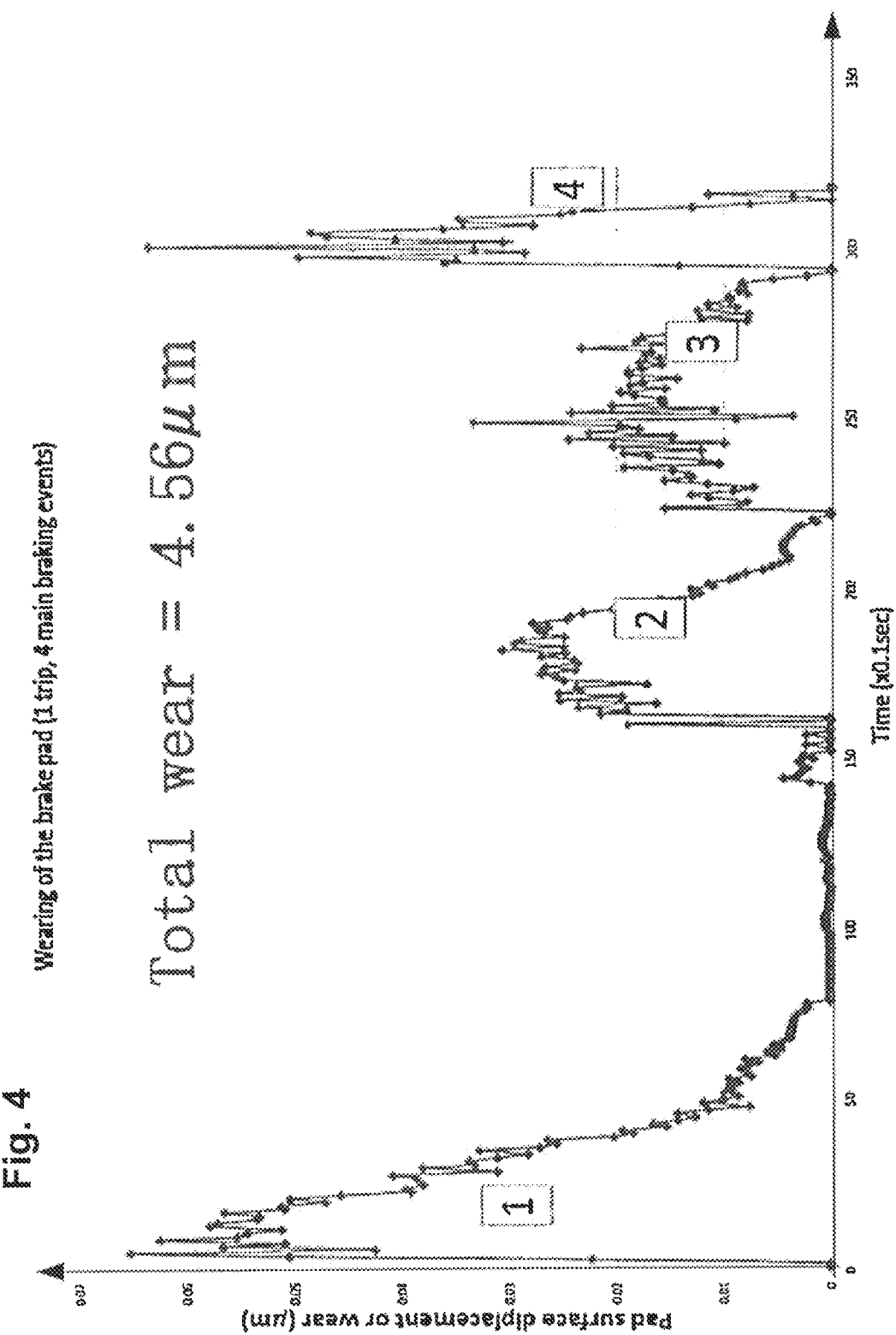
FIG. 4 is an exemplary view of an exemplary estimation result of real-time estimated brake wear and accumulated brake wear according to exemplary embodiments.

FIG. 4 is an exemplary view of an exemplary estimation result of real-time estimated brake wear and accumulated brake wear according to exemplary embodiments.

FIG. 4 exemplarily shows a brake wear computation result during an experimental trip with a vehicle, wherein multiple brake wear parameters (based on normal brake wear contribution and slope-considered brake wear contribution) are computed at a constant sampling frequency of about 10/second, i.e. the break wear is computed for time periods of 0.1 s, and only non-zero values are shown, exemplarily.

It can be seen that four main braking events, denoted as "1", "2", "3" and "4" could be identified, and an accumulated brake wear could be determined as "total wear=4.56 µm" of pad wear displacement.

Using the computed values and the accumulated value, an average brake pad degradation value can be computed, and a remaining lifetime of the brake pads can be estimated based on the average brake pad degradation value, e.g. for estimating an expected replacement timing.

Figure 5:
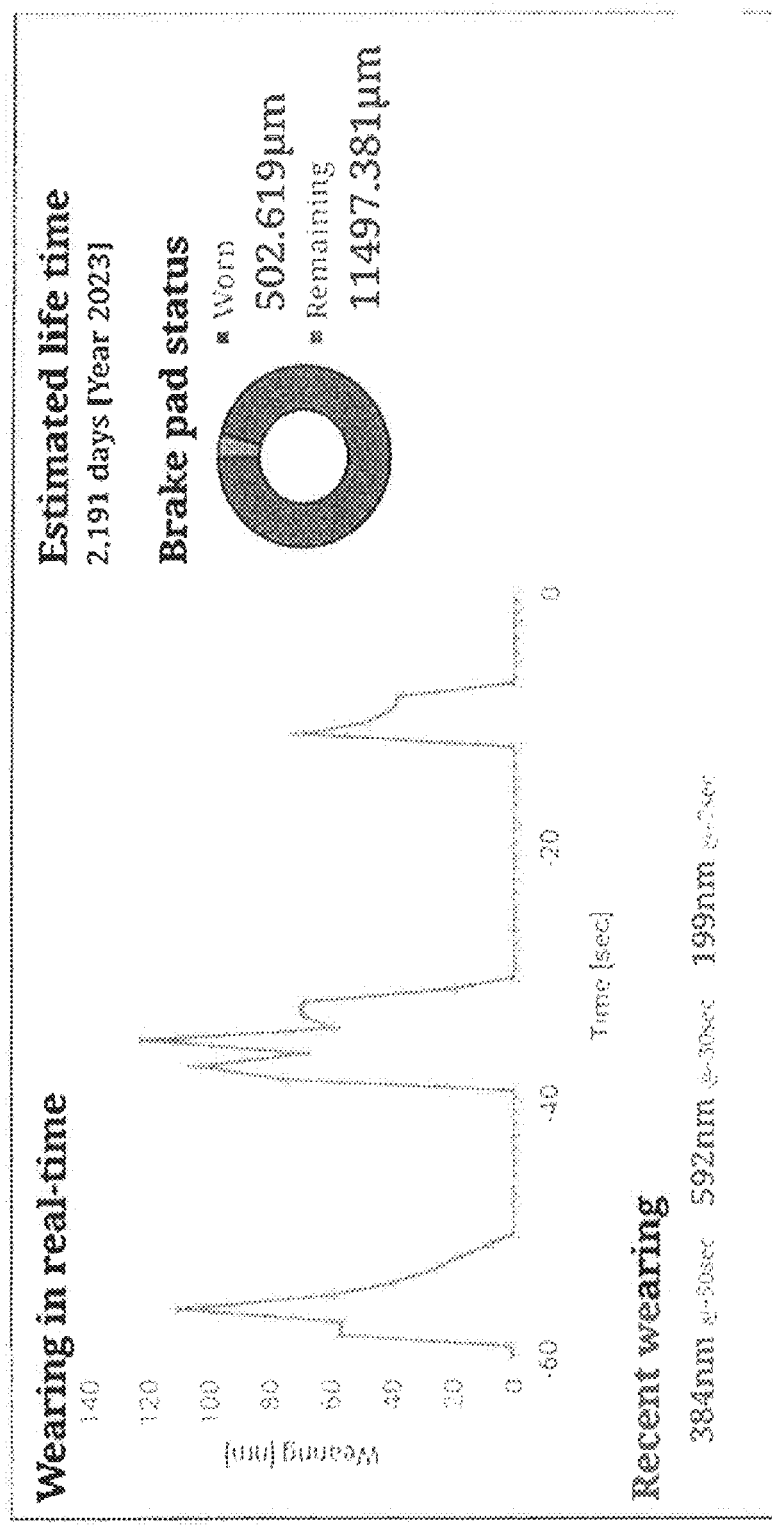
FIG. 5 is an exemplary view of an exemplary estimation result of real-time estimated brake wear and accumulated brake wear according to exemplary embodiments.

FIG. 5 is an exemplary view of an exemplary estimation result of real-time estimated brake wear and accumulated brake wear according to exemplary embodiments.

For example, FIG. 5 can represent a real-time display on a display screen, according to an example, exemplarily showing a real-time wearing analysis.

Exemplarily, a diagram may show a brake wearing (e.g. in units of µm or nm of brake pad wear, nm being exemplarily used in FIG. 5) as a function of time (e.g. in seconds), wherein FIG. 5 exemplarily shows the brake wearing as a function of time by showing, the last 60 seconds at a sampling rate of 1/s, i.e. an estimated brake wear is computed every second (and ε=1 s, exemplarily).

Furthermore, FIG. 5 exemplarily indicates recent wearing events as accumulated brake wear per braking event, wherein a braking event may be considered to have occurred during a time of brake activation or may be detected as the group of computation time periods during which subsequently a non-zero wearing parameter was computed.

Exemplarily, accumulated wearing events are illustrated as 334 nm (accumulated brake wear during a first braking event detected about 50 seconds ago, between about −60 s and −50 s), as 592 nm (accumulated brake wear during a second braking event detected about 30 seconds ago, between about −40 s and −30 s), and as 1.99 nm (accumulated brake wear during a third braking event detected about 7 seconds ago, between about −10 s and −5 s).

This has the advantage that a driver can see, in real-time, the recent brake event's effect on brake wear, and the driver may be influenced to change a driving behavior if they consider that the brake wear is too high.

Furthermore, FIG. 5 exemplarily indicates a brake pad status, exemplarily as a pie chart, wherein a percentage of accumulated brake wear since the last brake pad replacement, and the remaining brake pad thickness, is shown in relation to the overall brake pad thickness at replacement timing, exemplarily as 502.619 µm having been worn already and 11497.381 µm still remaining as brake pad thickness. Exemplarily, the numerical values are illustrated as well.

Furthermore, FIG. 5 exemplarily indicates an estimated remaining brake pad lifetime, e.g. based on an analysis of the total accumulated brake wear since the last replacement time and the time elapsed since the last replacement time, or based on an average wear over a defined time period, with respect to the remaining brake pad thickness or the brake pad thickness at the last replacement timing.

5. Exemplary Implementation on a Mobile Device

It is to be noted that exemplary embodiments can be conveniently be realized on an on-board apparatus of the vehicle, but can be also implemented on a mobile device such as a laptop or mobile phone (such as e.g. a smart phone).

Such mobile devices may communicate, e.g. via wireless communication, with an on-board apparatus of the vehicle to obtain sensor data. On the other hand, if the mobile device has implemented sensors, such as an altitude sensor, a position sensor, and/or acceleration sensor, or orientation sensor, or the like, a brake wear estimation may done without external sensor data.

For example, if a mobile device has a position detector and a clock, such as mobile phones, the mobile phone may detect positions at the sampling times, and by estimating a speed (e.g. based on position measurements over time), the mobile device may be configured to determine speed and speed changes (e.g. based on position measurements and optionally also based on an internal g-force sensor or acceleration sensor), as used e.g. in above "normal" brake wear estimations.

Furthermore, the mobile device may have an implemented user application which configures the device to regularly determine the positions, and derive speed data and speed change data as sensor data for the "normal" brake wear estimation based on speed $v(t_i)$ and speed change $\Delta v(\{t_i, t_{i+1}\})$, so as to then be configured to compute an estimated brake wear, e.g. according to the above-discussed expression:

$$\Delta W_{Normal}(\{t_i, t_{i+1}\}) = \frac{k \cdot m_{Vehicle} \cdot \Delta v(\{t_i, t_{i+1}\}) \cdot v(t_i)}{n_{Pads} \cdot A_{Pad} \cdot \mu}$$

Other parameters, such as k, $\mu$, $A_{Pad}$, and/or $n_{Pads}$ may be pre-stored as parameters. Also, the vehicle mass $m_{Vehicle}$ can be pre-stored.

Regarding the vehicle mass $m_{Vehicle}$, it is also possible that the user may input the vehicle mass via a user input, e.g. at application start or by setting functions, such as user configuration or menu functions. Also, it is possible that the user inputs the vehicle type (such as a car model), and the application uses (or selects) a vehicle mass pre-stored for the vehicle type (e.g. among a plurality of pre-stored parameters for plural vehicle types). It is further possible that the user inputs other weight/mass contributions such as passenger weight or number of passengers (to determine an additional weight contribution by the product of the input number of passengers and an average passenger weight) or a weight or number of luggage items. Regarding fuel weight, the user may also input a filling ratio of the fuel tank, or the like.

Furthermore, e.g. based on a position measurement by internal sensors and navigational map data, based on a combination of position and altitude measurements by internal sensors, and/or based on orientation sensor measurements, it is possible that the mobile device detects a slope angle, so that even a slope contribution computation is possible by the mobile device, e.g. according to the above-discussed expressions:

$$\Delta W_{Slope}(\{t_i, t_{i+1}\}) = \frac{k \cdot m_{Vehicle} \cdot g \cdot \sin(\theta(\{t_i, t_{i+1}\})) \cdot v(t_i) \cdot \varepsilon}{n_{Pads} \cdot A_{Pad} \cdot \mu}$$

or as $$\Delta W_{Slope}(\{t_i, t_{i+1}\}) \approx \frac{k \cdot m_{Vehicle} \cdot g \cdot 0.017 \cdot \theta(\{t_i, t_{i+1}\})[°] \cdot v(t_i) \cdot \varepsilon}{n_{Pads} \cdot A_{Pad} \cdot \mu}$$

The above implementation has the advantage that an efficient and reliable brake wear estimation can be conveniently performed even on a mobile device of the user/driver by internal sensors, even without communication with an on-board apparatus of the vehicle. Such aspect can be even implanted as a smart phone app. That is, such estimation algorithm according to exemplary embodiments can be carried out independently by a mobile device (e.g. notebook or mobile phone), and all required data needed to compute the brake wear can be retrieved by the mobile device based on internal data and sensors, hence an app on a mobile device can independently execute the wear computation algorithm.

By observing position, and computing speeds and speed changes, and/or by detecting longitudinal deceleration by a g-force sensor or acceleration sensor, a mobile device can detect brake activation independently, even without communicating with the vehicle or an on-board apparatus of the vehicle.

6. Miscellaneous

As will be appreciated by one of skill in the art, the present invention, as described hereinabove and the accompanying figures, may be embodied as a method (e.g., a computer-implemented process, or any other process), control apparatus (including a device, machine, system, computer program product, and/or any other apparatus), or a combination of the foregoing.

Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system". Furthermore, embodiments of the present invention may take the form of a computer program product on a computer-readable medium having computer-executable program code embodied in the medium.

Embodiments of the present invention are described hereinabove with reference to flowchart illustrations and/or block diagrams of methods and apparatuses. It will be understood that each block of the flowchart illustrations and/or block diagrams, and/or combinations of blocks in the flowchart illustrations and/or block diagrams can be implemented by computer-executable program code.

The computer-executable program code may be provided to a processor of a general purpose computer, special purpose computer, or other programmable data processing apparatus, such as e.g. a controller, to produce a particular machine, such that the program code, which executes via the processor of the computer or other programmable data processing apparatus, create means for implementing the functions/acts/outputs specified in the flowchart, block diagram block or blocks, figures, and/or written description. These computer-executable program code may also be stored in a computer-readable memory that can direct a computer or other programmable data processing apparatus to function in a particular manner, such that the program code stored in the computer readable memory produce an article of manufacture including instruction means which implement the function/act/output specified in the flowchart, block diagram block(s), figures, and/or written description. The computer-executable program code may also be loaded onto a computer or other programmable data processing apparatus to cause a series of operational steps to be performed on the computer or other programmable apparatus to produce a computer-implemented process such that the program code which executes on the computer or other programmable apparatus provides steps for implementing the functions/acts/outputs specified in the flowchart, block diagram block(s), figures, and/or written description. Alternatively, computer program implemented steps or acts may be combined with operator or human implemented steps or acts in order to carry out an embodiment of the invention.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

While certain exemplary embodiments have been described and shown in the accompanying drawings, it is to be understood that such embodiments are merely illustrative of and are not restrictive on the broad invention, and that the embodiments of invention are not limited to the specific constructions and arrangements shown and described, since various other changes, combinations, omissions, modifications and substitutions, in addition to those set forth in the above paragraphs, are possible. Those skilled in the art will appreciate that various adaptations, modifications, and/or combination of the just described embodiments can be configured without departing from the scope and spirit of the invention. Therefore, it is to be understood that, within the scope of the appended claims, the invention may be practiced other than as specifically described herein. For example, unless expressly stated otherwise, the steps of processes described herein may be performed in orders different from those described herein and one or more steps may be combined, split, or performed simultaneously. Those skilled in the art will also appreciate, in view of this disclosure, that different embodiments of the invention described herein may be combined to form other embodiments of the invention.

The invention claimed is:

1. A method for determining brake wear of a vehicle, comprising:
   determining, by a processor, for each of one or more time periods during which a brake of the vehicle is actuated, a speed of the vehicle at a start time of the respective time period and a speed change parameter indicative of a change of speed of the vehicle during the respective time period;
   determining, by the processor, for each of the one or more time periods during which a brake of the vehicle is actuated, whether the vehicle is traveling on a slope;
   determining, by the processor, for one or more first time periods during which the vehicle is not traveling on a slope, a respective first brake wear contribution parameter indicative of brake wear, without consideration of the slope, of one or more brakes of the vehicle during the respective first time period based on the speed of the vehicle at the start time of the respective first time period, the speed change parameter indicative of the change of speed of the vehicle during the respective first time period, and the mass or weight of the vehicle;
   determining, by the processor, for each of one or more second time periods during which the vehicle is traveling on a slope, a slope parameter indicative of a slope inclination angle of the slope on which the vehicle is traveling;
   determining, by the processor, a respective second brake wear contribution parameter indicative of brake wear at one or more brakes of the vehicle during the respective second time period based on the speed of the vehicle at the start time of the respective second time period, the mass or weight of the vehicle, and the respective determined slope parameter indicative of the slope inclination angle; and
   determining, by the processor, a respective brake wear parameter based on the first and second brake wear contribution parameters, based on a linear combination or sum of the first and second brake wear contribution parameters.

2. The method according to claim 1, wherein the respective second brake wear contribution parameter is determined further based on the time length of the respective time period.

3. The method according to claim 1, wherein the respective second brake wear contribution parameter is determined to be zero when the slope inclination angle during the respective time period is smaller than a threshold.

4. The method according to claim 1, wherein plural respective brake wear parameters are determined for plural time periods, and the method further comprises:
   accumulating, by the processor, the plural respective brake wear parameters to determine an accumulated brake wear parameter indicative of brake wear at one or more brakes of the vehicle during an accumulation duration spanning the plural time periods.

5. The method according to claim 4, further comprising:
   determining, by the processor, at least one of a remaining lifetime or an expected brake replacement time based on the accumulated brake wear parameter and a length of the accumulation duration.

6. The method according to claim 1, wherein the respective first brake wear contribution parameter is determined to be zero when the change of speed of the vehicle during the respective time period is smaller than a threshold.

7. The method according to claim 1, wherein the respective brake wear parameter is determined to be zero for at least one of (i) time periods in which the brake of the vehicle is not activated, (ii) time periods in which the brake of the vehicle is activated and the vehicle speed is determined to be smaller than a.

8. The method according to claim 1, further including:
obtaining, by the processor, sensor data indicative of brake system characteristics of the vehicle, and determining, by the processor, whether the brake system is in a fault state based on a brake system anomaly detection performed on the basis of the obtained sensor data, before determining, by the processor, the respective brake wear parameter based on at least one of the sensor data or parameters derived from the obtained sensor data.

9. The method according to claim 8, wherein
the brake system anomaly detection is performed by mapping the obtained sensor data to an abstract sensor data vector space and comparing the vector space position of the mapped sensor data to one or more cluster regions in the vector space which are associated with normal operation of the brake system, by a machine learning algorithm including mapping sensor data obtained during normal operation of the brake system to the abstract sensor data vector space.

10. An apparatus for determining brake wear of a vehicle, the apparatus including a memory and a processor being configured to execute program code to perform operations comprising:
determining, for each of one or more time periods during which a brake of the vehicle is actuated, a speed of the vehicle at a start time of the respective time period and a speed change parameter indicative of a change of speed of the vehicle during the respective time period;
determining, for each of the one or more time periods during which a brake of the vehicle is actuated, whether the vehicle is traveling on a slope;
determining, for each of the one or more first time periods during which the vehicle is not traveling on a slope, a respective first brake contribution wear parameter indicative of brake wear, without consideration of the slope, of one or more brakes of the vehicle during the respective first time period based on the speed of the vehicle at the start time of the respective first time period, the speed change parameter indicative of the change of speed of the vehicle during the respective first time period, and the mass or weight of the vehicle;
determining for each of one or more second time periods during which the vehicle is traveling on a slope, a slope parameter indicative of a slope inclination angle of the slope on which the vehicle is traveling;
determining a respective second brake wear contribution parameter indicative of brake wear of one or more brakes of the vehicle during the respective second time period based on the speed of the vehicle at the start time of the respective second time period, the mass or weight of the vehicle, and the respective determined slope parameter indicative of the slope inclination angle; and
determining a respective brake wear parameter based on the first and second brake wear contribution parameters, based on a linear combination or sum of the first and second brake wear contribution parameters.

11. A computer program product including a computer program including computer program instructions adapted to cause a controller, computer, processor or mobile computing device to execute the steps of a method of claim 1.

* * * * *